(12) United States Patent
Fujiwara

(10) Patent No.: US 6,463,166 B1
(45) Date of Patent: Oct. 8, 2002

(54) FINGERPRINT INPUT APPARATUS

(75) Inventor: Hisatoshi Fujiwara, Tokyo (JP)

(73) Assignee: Yamatake-Honeywell Co., Ltd. (JP)

( * ) Notice: Subject to any disclaimer, the term of this patent is extended or adjusted under 35 U.S.C. 154(b) by 28 days.

(21) Appl. No.: 09/655,155

(22) Filed: Sep. 5, 2000

Related U.S. Application Data

(62) Division of application No. 08/985,112, filed on Dec. 4, 1997, now Pat. No. 6,185,319.

(30) Foreign Application Priority Data

| Dec. 6, 1996 | (JP) | ............................................. 8-326660 |
| Jun. 20, 1997 | (JP) | ............................................. 9-164005 |
| Jun. 20, 1997 | (JP) | ............................................. 9-164018 |
| Sep. 26, 1997 | (JP) | ............................................. 9-262009 |
| Sep. 26, 1997 | (JP) | ............................................. 9-262039 |

(51) Int. Cl.⁷ ................................................. G06K 9/00
(52) U.S. Cl. ......................................... 382/127; 356/71
(58) Field of Search ........................ 382/115, 124–127; 356/71

(56) References Cited

U.S. PATENT DOCUMENTS

| 3,527,535 | | 9/1970 | Monroe ........................ 356/71 |
| 3,670,305 | | 6/1972 | Maloney ................ 340/146.3 P |
| 4,455,083 | | 6/1984 | Elmes .......................... 356/71 |
| 4,681,435 | | 7/1987 | Kubota et al. ................. 356/71 |
| 4,876,725 | * | 10/1989 | Tomko ......................... 356/71 |
| 5,233,404 | | 8/1993 | Lougheed et al. ............. 356/71 |
| 5,416,573 | | 5/1995 | Sartor, Jr. .................... 356/71 |
| 5,621,516 | * | 4/1997 | Shinzaki et al. ............... 356/71 |
| 5,761,330 | * | 6/1998 | Stoianov et al. ............ 382/127 |
| 6,185,319 | * | 6/2001 | Fujiwara .................... 382/127 |

FOREIGN PATENT DOCUMENTS

| EP | 06103369 | 4/1994 | ........... G06F/15/64 |
| JP | 63-205777 | 8/1988 | |
| JP | 1-175357 | 12/1989 | |
| JP | 2-50782 | 2/1990 | |
| JP | 5-89229 | 4/1993 | |
| JP | 5-101168 | 4/1993 | |
| JP | 6-147852 | 5/1994 | |
| JP | 7-108526 | 4/1995 | |
| JP | 7-254062 | 10/1995 | |
| WO | WO 93/10508 | 5/1993 | ............ G06K/9/00 |

OTHER PUBLICATIONS

"Introduction to Computer Image Processing" Japan Industrial Technology Center pp. 44–45, Jun., 1990.
"Fingerprint Identification Algorithm Using 2–D DFT" Savemation Review pp. 2–7, Feb., 1995.
"Fingerprint Identification System using Liquid Crystal Spatial Light Modulators for Phase Modulation", The Institute of Electronics, Information and Communication Engineers, Proceedings of the 1993 IEICE Fall Conference D–287, Sep. 1993.

* cited by examiner

Primary Examiner—Bhavesh Mehta
(74) Attorney, Agent, or Firm—Blakely Sokoloff Taylor & Zafman

(57) ABSTRACT

A fingerprint input apparatus includes a prism, a light source, a pinhole, and an imaging plane. The prism is placed such that a surface in one direction serves as a fingerprint collection surface. The light source irradiates light on the fingerprint collection surface through the prism. The pinhole is set in the path of light which is reflected by the pattern surface of a finger placed on the fingerprint collection surface and emerges from the prism. The light emerging from the prism and passing through the pinhole is formed into an image on the imaging plane. When the prism is substituted by air, an optical fingerprint collection surface equivalent to the fingerprint collection surface is set to be substantially parallel to the imaging plane.

2 Claims, 27 Drawing Sheets

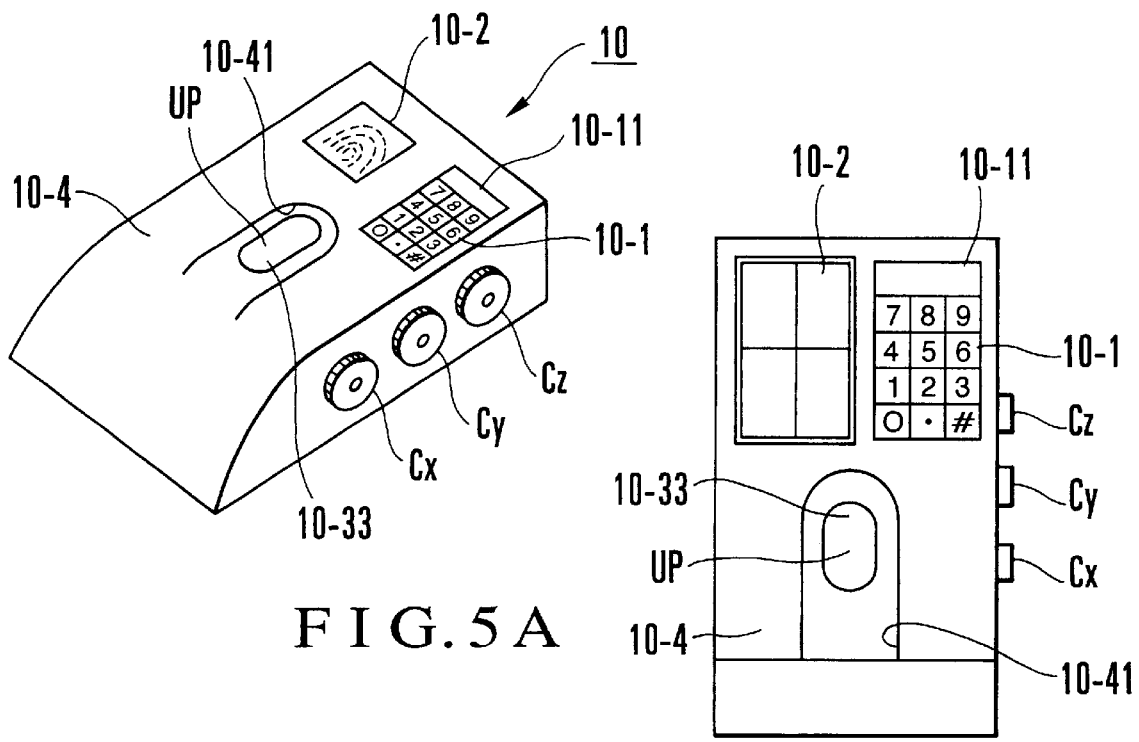
FIG.5A
FIG.5B
FIG.6A
FIG.6B

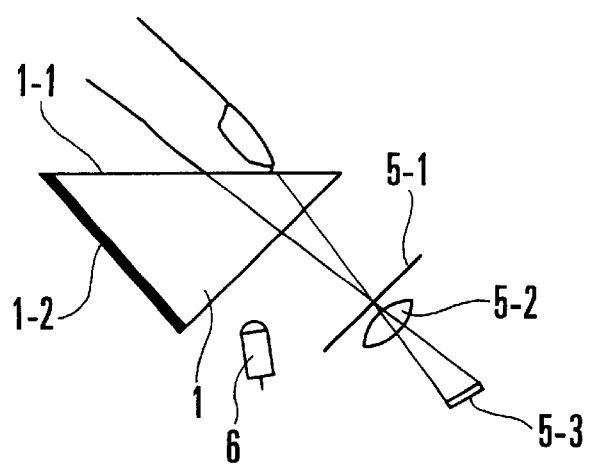
F I G. 17
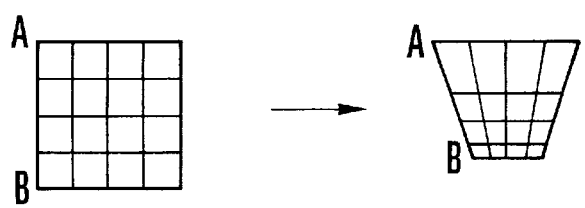
F I G. 18A   F I G. 18B
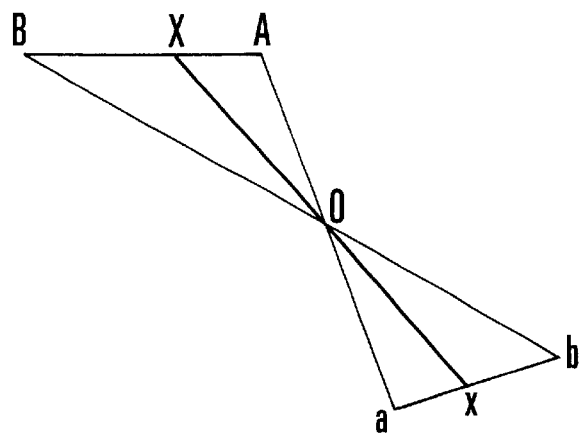
F I G. 19

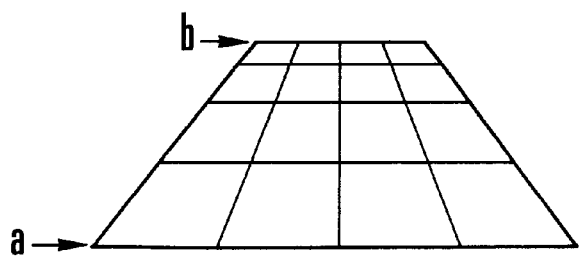 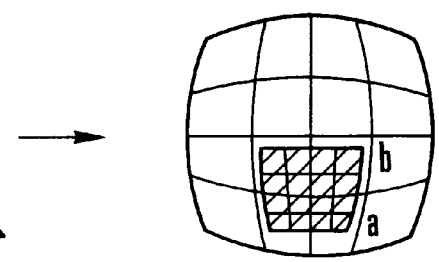
FIG. 21A  FIG. 21B
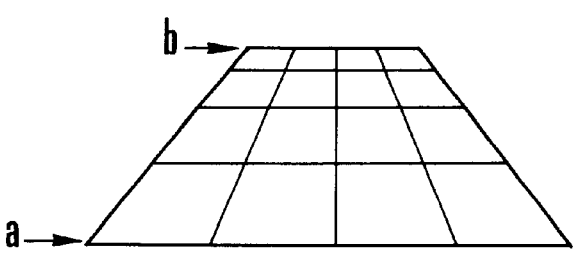 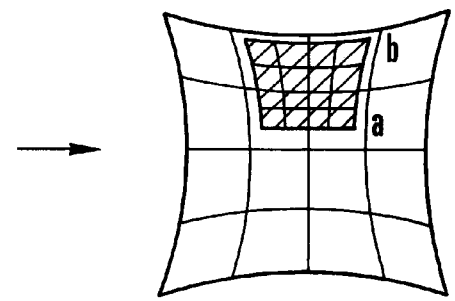
FIG. 22A  FIG. 22B

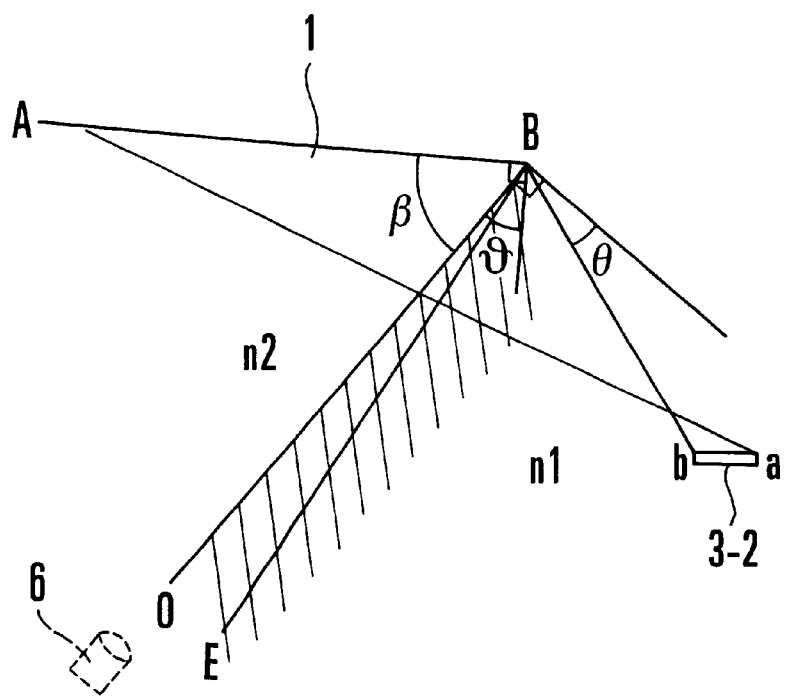
F I G. 28
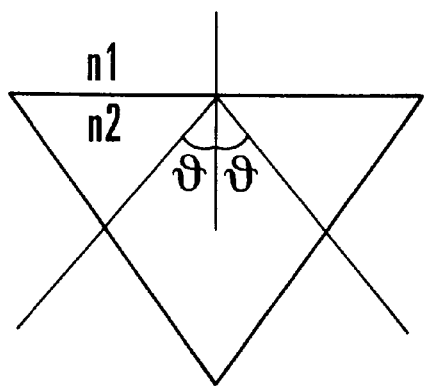
F I G. 29

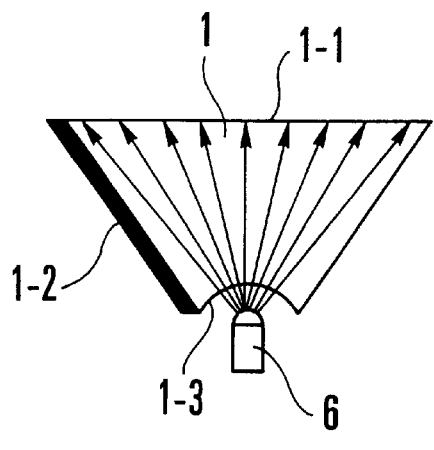
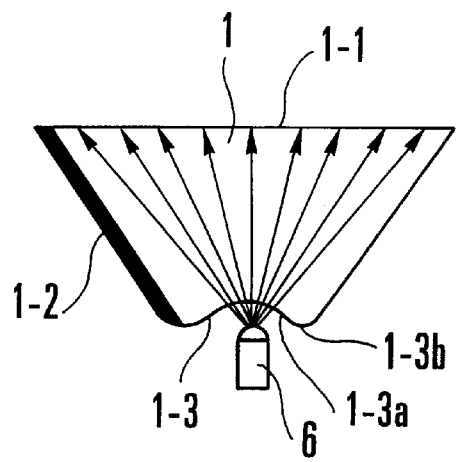
FIG. 33A  FIG. 33B
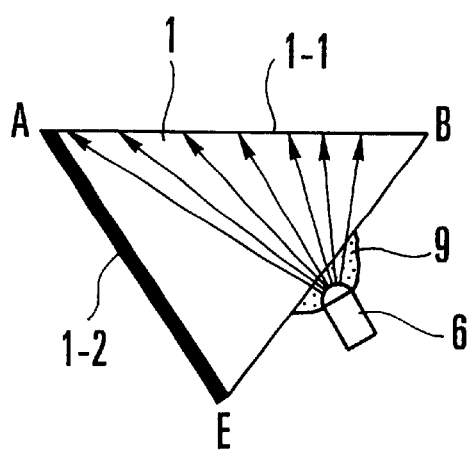
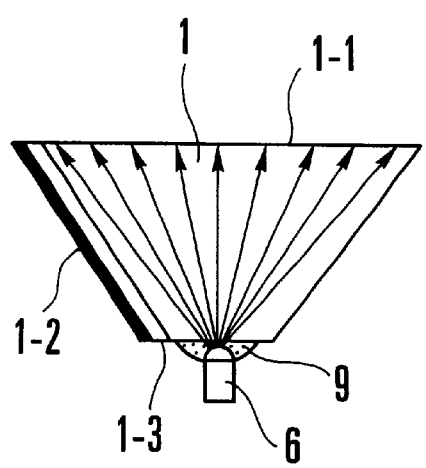
FIG. 34A  FIG. 34B

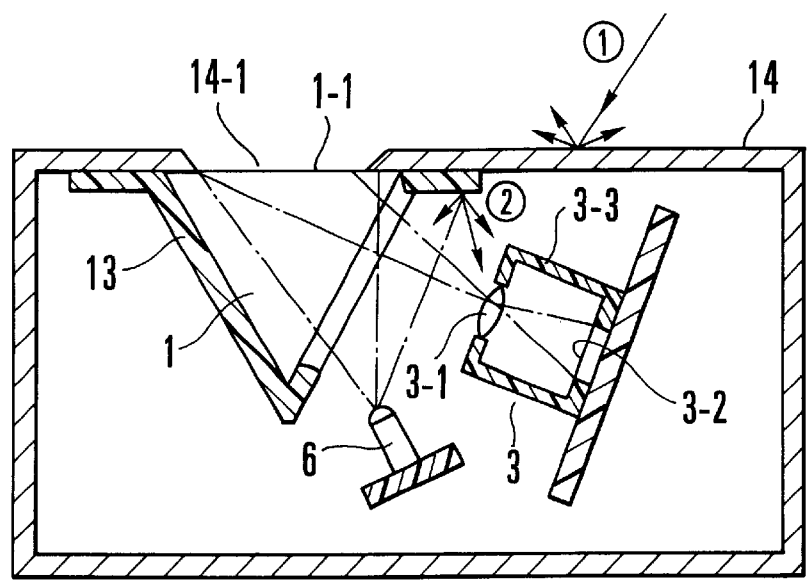
F I G. 41
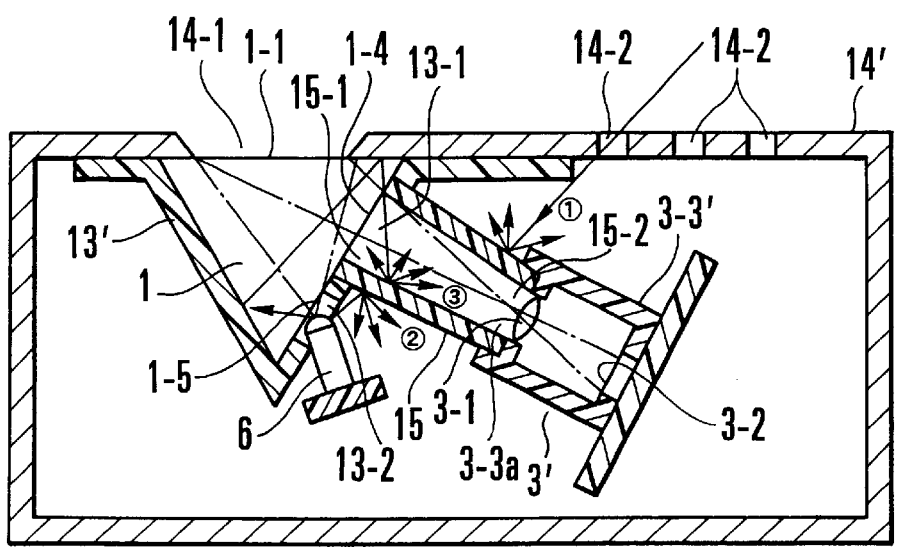
F I G. 42

FINGERPRINT INPUT APPARATUS

This is a divisional of application Ser. No. 08/985,112 filed Dec. 4, 1997 now U.S. Pat No. 6,185,319.

BACKGROUND OF THE INVENTION

The present invention relates to a fingerprint input apparatus for inputting fingerprints to register them or collate them with fingerprints already registered.

None of the fingerprints of different people coincide with each other, and the fingerprints do not change throughout their lives. Owing to these characteristics of fingerprints, fingerprint collation systems are especially used in the fields that require high degrees of security. An apparatus for inputting fingerprint images is a constituent element of such a fingerprint collation system. This fingerprint input apparatus includes an optical system as a constituent. The collation precision of the fingerprint collation system greatly depends on whether fingerprint images can be correctly input.

Any conventional fingerprint input apparatus, however, cannot obtain high-quality fingerprint images.

SUMMARY OF THE INVENTION

The present invention has been made to solve this problem, and has as its object to provide a fingerprint input apparatus which can obtain high-quality fingerprint images.

In order to achieve the above object, according to the first aspect of the present invention, there is provided a fingerprint input apparatus comprising a prism placed such that a surface in one direction serves as a fingerprint collection surface, a light source for irradiating light on the fingerprint collection surface through the prism, a pinhole set in a path of light which is reflected by a pattern surface of a finger placed on the fingerprint collection surface and emerges from the prism, and an imaging place on which the light emerging from the prism and passing through the pinhole is formed into an image, wherein when the prism is substituted by air, an optical fingerprint collection surface equivalent to the fingerprint collection surface is set to be substantially parallel to the imaging plane.

According to this aspect, light reflected by the pattern surface of the finger directly or indirectly placed on the fingerprint collection surface and emerging from the prism passes through the pinhole and is formed into an image on the imaging plane set to be almost parallel to the optical fingerprint collection surface of the prism.

According to the second aspect of the present invention, in the first aspect, when the optical fingerprint collection surface has distortion with respect to the fingerprint collection surface, the imaging plane is rotated through a predetermined angle. According to this aspect, distortion caused on the optical fingerprint collection surface can be reduced by rotating the imaging plane almost parallel to the optical fingerprint collection surface of the prism through a predetermined angle.

According to the third aspect of the present invention, there is provided a fingerprint input apparatus comprising a first prism placed such that a surface in one direction serves as a fingerprint collection surface, a light source for irradiating light on the fingerprint collection surface through the first prism, a pinhole set in a path of light which is reflected by a pattern surface of a finger placed on the fingerprint collection surface and emerges from the first prism, an imaging plane on which the light emerging from the first prism and passing through the pinhole is formed into an image, and a second prism placed in front of the imaging plane, wherein the fingerprint collection surface of the first prism is set to be substantially parallel to the imaging plane, the fingerprint collection surface of the first prism is set to be substantially parallel to a surface of the second prism on the imaging plane side, and an exit surface of the first prism with respect to the pinhole is set to be substantially parallel to an incident surface of the second prism with respect to the pinhole.

According to this aspect, the optical system on the first prism side is made similar to the optical system on the second prism side with the pinhole being the center, and light reflected by the pattern surface of the finger directly or indirectly placed on the fingerprint collection surface and emerging from the first prism passes through the pinhole and the second prism and is formed into an image on the imaging plane.

According to the fourth aspect of the present invention, in the first, second, and third aspects, the apparatus further comprises pinhole position adjusting means for adjusting a position of the pinhole. According to this aspect, the position and size of a fingerprint image on the imaging plane can be changed by adjusting the position of the pinhole in the back-and-forth direction, the lateral direction, the vertical direction, and the like.

According to the fifth aspect of the present invention, in the fourth aspect, the pinhole position adjusting means is constituted by a manual adjusting mechanism, and the apparatus further comprises a display section for displaying a fingerprint image formed on the imaging plane. According to this aspect, the user can change the position and size of a fingerprint image on the imaging plane by adjusting the position-of the pinhole in the back-and-forth direction, the lateral direction, the vertical direction, and the like while seeing the displayed fingerprint image.

According to the sixth aspect of the present invention, the pinhole position adjusting means automatically adjusts the position of the pinhole. According to this aspect, the position of the pinhole is automatically adjusted, and the position and size of a fingerprint image on the imaging plane are adjusted to set values.

According to the seventh aspect of the present invention, in the first, second, and third aspect, the light source is an LED or a laser beam radiator. According to this aspect, light from an LED or a laser beam radiator, i.e., light having a single wavelength, is irradiated on the fingerprint collection surface through the prism.

According to the eighth aspect of the present invention, there is provided a fingerprint input apparatus comprising a prism placed such that a surface in one direction serves as a fingerprint collection surface, a light source for irradiating light on the fingerprint collection surface through the prism, a pinhole set in a path of light which is reflected by a pattern surface of a finger placed on the fingerprint collection surface and emerges from the prism, a lens placed close to a rear side of the pinhole, and an imaging plane on which the light emerging from the prism and passing through the pinhole and the lens is formed into an image, wherein when a straight line connecting a center of the fingerprint collection surface and a center of the imaging plane is an optical axis, the imaging plane is inclined with respect to the optical axis to prevent blur, and a central axis of the lens is inclined with respect to the optical axis to prevent trapezoidal distortion.

According to this aspect, the light intensity of a fingerprint image formed on the imaging plane is increased by the lens placed close to the rear side of the pinhole. In this case, a blur is suppressed by inclining the imaging plane with respect to the optical axis, and trapezoidal distortion is suppressed by inclining the central axis of the lens with respect to the optical axis under the condition in which this blur is suppressed.

According to the ninth aspect of the present invention, in a fingerprint input apparatus based on the optical path separation method, a cut surface is formed at a distance from a vertex of the prism which opposes the fingerprint collection surface, and the light source is placed to oppose the cut surface of the prism. According to this aspect, light from the light source is incident on the prism through the cut surface to be irradiated on the fingerprint collection surface with an almost uniform diffusion angle.

According to the 10th aspect of the present invention, in the ninth aspect, the cut surface is formed under conditions that an imaging optical path of light from the fingerprint collection surface to the imaging plane is not shielded, and an image of the light source is not projected on the imaging plane. According to this aspect, the imaging optical path of light from the fingerprint collection surface to the imaging plane is not shielded in the prism, and an image of the light source is not projected on the imaging plane.

According to the 11th aspect of the present invention, in the ninth aspect, the cut surface is formed under conditions that an imaging optical path of light from the fingerprint collection surface to the imaging plane is not shielded, an image of the light source is not projected on the imaging plane, and light from the light source is not totally reflected by the fingerprint collection surface. According to this aspect, the imaging optical path of light from the fingerprint collection surface to, the imaging plane is not shielded in the prism, and an image of the light source is not projected on the imaging plane. In addition, light from the light source is not totally reflected by the fingerprint collection surface.

According to the 12th aspect of the present invention, in the ninth aspect, the cut surface is formed under a condition that an imaging optical path of light from the fingerprint collection surface to the imaging plane is not shielded, and a light shield is provided for a region, on the cut surface, on which an image of the light source can be projected. According to this aspect, the imaging optical path of light from the fingerprint collection surface to the imaging plane is not shielded in the prism. In addition, since the light shield is provided for the cut surface, there is no possibility that an image of the light source is projected on the imaging plane.

According to the 13th aspect of the present invention, in the ninth to 12th aspects, the cut surface of the prism is a concave surface. According to this aspect, light from the light source is incident on the prism through the concave cut surface and irradiated on the fingerprint collection surface with a uniform diffusion angle.

According to the 14th aspect of the present invention, in the 13th aspect, the cut surface of the prism has a convex outer periphery. According to this aspect, light from the light source is diffused by the concave inner surface of the cut surface, and is focused by the convex outer surface of the outer periphery of the cut surface to be irradiated on the fingerprint collection surface.

According to the 15th aspect of the present invention, in a fingerprint input apparatus based on the optical path separation method, the light source is placed in contact with the prism through a matching member having a predetermined refractive index. According to this aspect, light from the light source is incident on the prism through the matching member to be irradiated on the fingerprint collection surface with a almost uniform diffusion angle.

According to the 16th aspect of the present invention, there is provided a fingerprint input apparatus comprising a prism placed such that a surface in one direction serves as a fingerprint collection surface, and a light source mounted on a surface of a substrate and serving to irradiate light on the fingerprint collection surface through the prism, wherein a film having a high reflectance is formed on the surface of the substrate on which the light source is mounted. According to this aspect, light leaking from the side and rear surfaces of the light source is reflected by the reflecting film on the substrate surface and incident on the prism.

According to the 17th aspect of the present invention, there is provided a fingerprint input apparatus comprising a prism placed such that a surface in one direction serves as a fingerprint collection surface, and a light source mounted on a surface of a substrate and serving to irradiate light on the fingerprint collection surface through the prism, wherein a film-for shielding light is formed on the surface of the substrate on which the light source is mounted. According to this aspect, light leaking from the side and rear surfaces of the light source is shielded by the light-shielding film on the substrate surface, thereby preventing the light from passing through the substrate and leaking out from its rear surface.

According to the 18th aspect of the present invention, there is provided a fingerprint input apparatus comprising a prism placed such that a surface in one direction serves as a fingerprint collection surface, and a light source mounted on a surface of a substrate and serving to irradiate light on the fingerprint collection surface through the prism, wherein a film (reflecting/light-shielding film) having a high reflectance and shielding light is formed on the surface of the substrate on which the light source is mounted. According to this aspect, light leaking from the side and rear surfaces of the light source is reflected by the reflecting/light-shielding film on the substrate surface and incident on the prism. In addition, light leaking from the side and rear surfaces of the light source is shielded by the reflecting/light-shielding film on the substrate surface, thereby preventing the light from passing through the substrate and leaking from its rear surface.

According to the 19th aspect of the present invention, there is provided a fingerprint input apparatus comprising a prism placed such that a surface in one direction serves as a fingerprint collection surface, and a light source for irradiating light on the fingerprint collection surface through the prism, an imaging plane on which light reflected by a pattern surface of a finger placed on the fingerprint collection surface and emerging from the prism is formed in to an image, a prism holder for holding the prism to fix the fingerprint collection surface such that the fingerprint collection surface opposes a finger mount portion opening of a main body case, the prism holder having an opening at least in a surface portion opposing an exit surface of the prism and an incident surface of the prism on which light from the light source is incident, and a light-shielding cover for covering an imaging optical path between the exit surface of the prism and the imaging plane while isolating the optical path from the outside.

According to the 20th aspect of the present invention, in the 19th aspect, an optical noise process is performed for a surface of an inner wall of the light-shielding cover.

According to the 21st aspect of the present invention, in the 19th or 20th aspect, a film having a high reflectance is formed on a surface of an outer all of the light-shielding cover.

According to the 22nd aspect of the present invention, in the 19th aspect, the light source is covered with a light source cover except for a portion on the exit surface side with respect to the prism, and the light source cover and the light-shielding cover are integrally formed.

According to the 23rd aspect of the present invention, in the 22nd aspect, a film having a high reflectance is formed on a surface of an inner wall of the light source cover.

According to the 24th aspect of the present invention, there is provided a fingerprint input apparatus comprising a prism placed such that a surface in one direction serves as a fingerprint collection surface, a light source for irradiating light on the fingerprint collection surface through a prism, an imaging plane on which light reflected by a pattern surface of a finger placed on the fingerprint collection surface and emerging from the prism is formed into an image, a prism holder for holding the prism to fix the fingerprint collection surface such that the fingerprint collection surface opposes a finger mount portion opening of a main body case, the prism holder having openings at least in a surface portion opposing an exit surface of the prism and an incident surface of the prism on which light from the light source is incident, an imaging plane case for storing the imaging plane, the case having an opening on the exit surface side of the prism. and a light-shielding cover for covering an imaging optical path between the exit surface of the prism and the imaging plane while isolating the optical path from the outside, wherein an opening of the light-shielding cover on one end side is coupled to the opening of the prism holder which opposes the exit surface of the prism with a fitting structure, and an opening of the light-shielding cover on the other end side is coupled to the opening of the imaging plane case with a fitting structure.

BRIEF DESCRIPTION OF THE DRAWINGS

FIGS. 5A and 5B are a perspective view and a plan view, respectively, showing the fingerprint input apparatus in FIG. 2;

FIGS. 6A and 6B are views respectively showing how fingerprint images are displayed in registration and collation processes;

FIG. 17 is a view showing the main part of a fingerprint input apparatus having a lens near the rear surface of a pinhole plate;

FIGS. 18A and 18B are views for explaining trapezoidal distortion caused in this fingerprint input apparatus;

FIG. 19 is a view for explaining trapezoidal distortion caused in this fingerprint input apparatus;

FIGS. 21A and 21B are views for explaining how trapezoidal distortion is corrected by barrel distortion;

FIGS. 22A and 22B are views for explaining how trapezoidal distortion is corrected by pincushion distortion;

FIG. 28 is a view for explaining condition ② for the formation of a cut surface;

FIG. 29 is a view for explaining condition ③ for the formation of a cut surface;

FIGS. 33A and 33B are views respectively showing the main parts (Embodiments 3-3 and 3-4) of fingerprint input apparatuses according to the present invention;

FIGS. 34A and 34B are views showing the main part (Embodiment 3-5) of a fingerprint input apparatus according to the present invention;

FIG. 41 is a view showing the main part of a conventional fingerprint input apparatus on which Embodiment 5 is based;

FIG. 42 is a view showing the main part (Embodiment 5-1) of a fingerprint input apparatus according to the present invention;

DESCRIPTION OF THE PREFERRED EMBODIMENTS

Embodiments of the present invention will be described in detail below.

Embodiment 1

First to Seventh Aspects

Prior to a description of the first to seventh aspects of the present invention, the techniques on which these aspects are based will be described. To obtain high-quality fingerprint images, some countermeasures must be taken against fingerprint image distortion and blurs. Several fingerprint input apparatuses designed to cope with fingerprint image distortion and blurs have already been proposed in Japanese Patent Laid-Open No. 59-142675, Japanese Utility Model Laid-Open No. 63-99960, Japanese Patent Laid-Open No. 2-176984, and the like. Since all these fingerprint input apparatuses use lenses for optical systems, fingerprint distortion and blurs cannot be eliminated at once.

Figure 16:
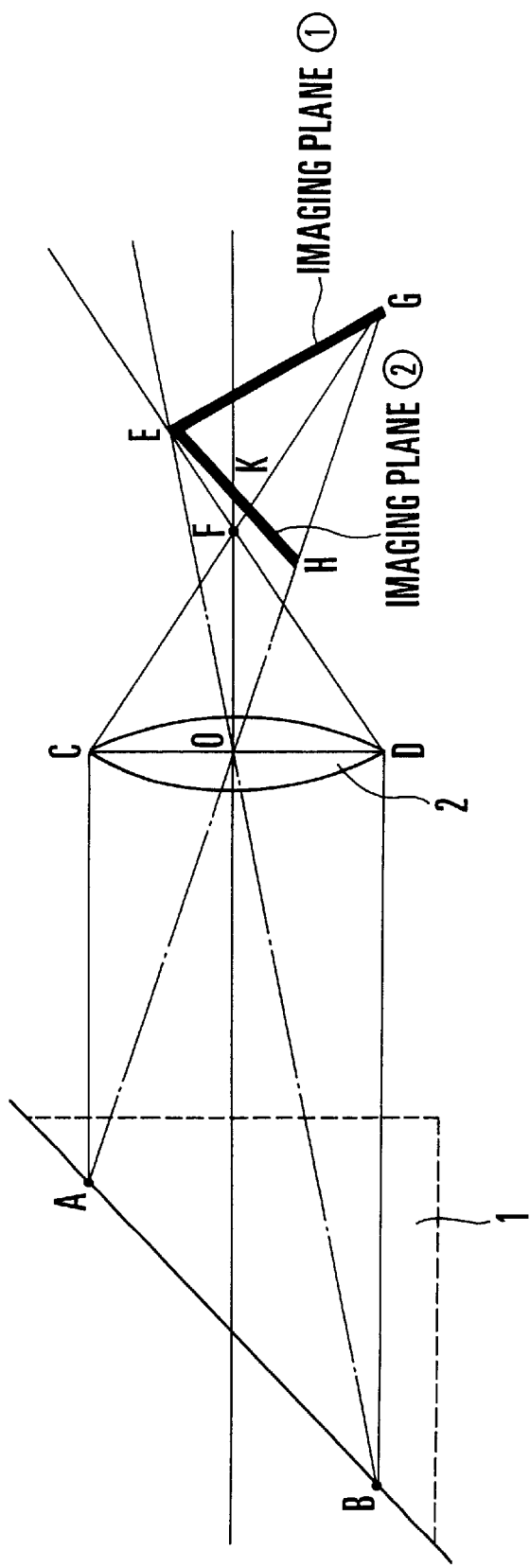
FIG. 16 is a view for explaining the main part of the optical system of a conventional fingerprint input apparatus.

FIG. 16 shows the main part of the optical system of a conventional fingerprint input apparatus. Referring to FIG. 16, reference numeral 1 denotes a prism; and 2, a lens. Reference symbol A-B denotes, the fingerprint collection surface of the prism 1; O, the center of the lens 2; and F, the focal point of the lens 2. For the sake of descriptive convenience, in the arrangement shown in FIG. 16, the prism 1 is assumed to have the same refractive index as that of air. Although not shown, an incandescent lamp is placed on the lower surface side of the prism 1 such that light from the incandescent lamp is irradiated on the fingerprint collection surface A-B through the prism 1.

In this optical system, the imaging plane of a light-receiving unit may be set to a plane E-G (imaging plane ①) to prevent an entire image of the pattern surface of a finger placed on the fingerprint collection surface A-B, i.e., an entire fingerprint image, from blurring. In this case, however, since the optical path ratio varies (AO:OG≠BO:OE), the fingerprint image is distorted. To prevent the fingerprint image from being distorted, the imaging plane of the light-receiving unit may be set to a plane E-H (imaging plane ②). In this case, however, a point A on the fingerprint collection surface A-B expands to "H-K" on the imaging plane E-H. As a result, the fingerprint image blurs. As described above, a blur and distortion cannot be eliminated at once as long as the lens 2 is used. As importance is attached to correction of distortion, the blur worsens and leads to difficulty in practical use, and vice versa. That is, with the arrangement shown in FIG. 16, a compromise must be made between distortion and a blur within the respective practical ranges.

Under the circumstances, Embodiment 1 uses a pinhole plate in place of the lens 2 to greatly reduce distortion and a blur so as to obtain a high-quality fingerprint image.

[Basic Principle]

Figure 1A:
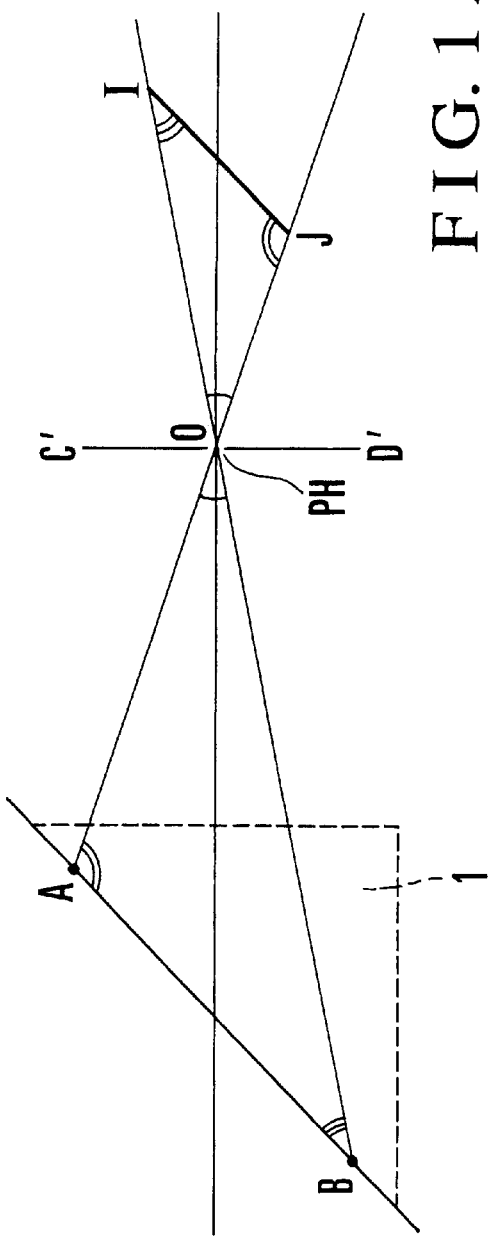
FIGS. 1A and 1B are views for explaining the main part (Embodiment 1) of the optical system of a fingerprint input apparatus according to the present invention.
Figure 1B:
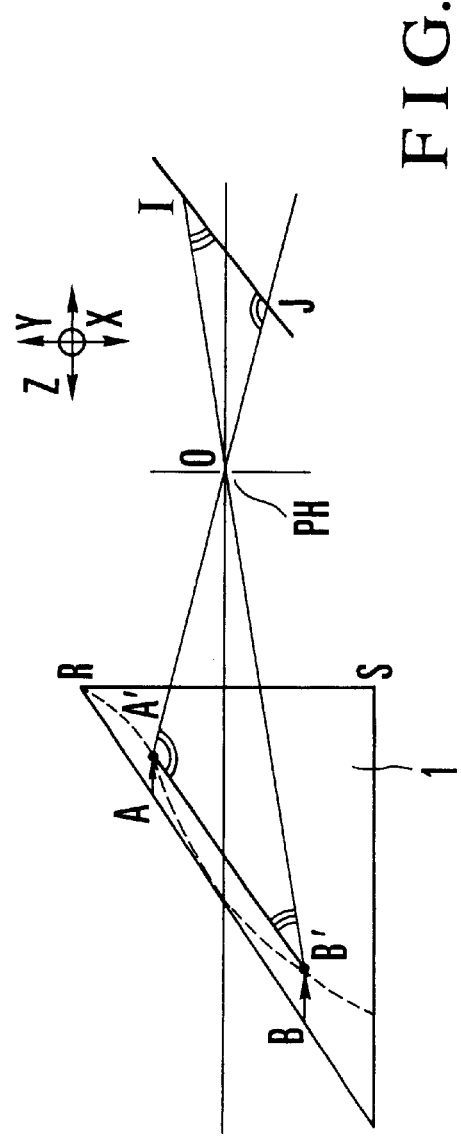

FIG. 1A shows the main part of the optical system of a fingerprint input apparatus according to the present invention. Referring to FIGS. 1A and 1B, reference symbol A-B denotes the fingerprint collection surface of a prism 1; C'-D', a pinhole plate surface having a pinhole PH formed in its center; and O, the center of the pinhole PH. For the sake of descriptive convenience, in the arrangement shown in FIG. 1A, the prism 1 is assumed to have the same refractive index as that of air. Although not shown, an LED is placed on the lower surface side of the prism 1 such that light from the LED is irradiated on the fingerprint collection surface A-B through the prism 1. Note that this LED may be a laser beam radiator. Light emitted from an LED or laser beam radiator has a single wavelength and is less in optical irregularity than light from an incandescent lamp. Owing to such characteristics, the LED allows a high resolution, and has a long service life. In addition, the heat generated by the LED exerts little influence on the apparatus.

In this optical system, the light reflected by the fingerprint surface of the finger placed on the fingerprint collection surface A-B and emerging from the prism 1 passes through the pinhole PHWand is formed into an image on an imaging plane I-J. In this case, if the fingerprint collection surface A-B of the prism 1 and the imaging plane I-J are set to be parallel to each other, the optical path ratio is made constant (AO:OJ=BO:OI), and no fingerprint image distortion occurs. In addition, since one point on the fingerprint collection surface A-B is imaged on one point on the imaging plane I-J, no fingerprint image blur occurs. That is, both distortion and a blur can be prevented at once.

In the arrangement shown in FIG. 1A, the prism 1 is assumed to have the same refractive index as that of air. In practice, however, the refractive index of the prism 1 differs from that of air. For this reason, as shown in FIG. 1B, a surface equivalent to the fingerprint collection surface A-B when the prism 1 is substituted by air is set as an optical fingerprint collection surface A'-B' (a curved surface A'-B' indicated by the dotted line in FIG. 1B), and this optical fingerprint collection surface A'-B' and the imaging plane I-J are set to be parallel to each other. In this case, since it is difficult to form the imaging plane I-J into a curved surface in terms of techniques and cost, the straight line A'-B' and the imaging plane I-J are set to be parallel to each other. In other words, a triangle A'OB' and a triangle JOI are set to be similar to each other. With this arrangement, the optical path ratio is made constant (A'O:OJ=B'O:OI), and hence fingerprint image distortion can be suppressed. In addition, since one point on the straight line A'-B' is imaged on one point on the imaging plane I-J, a fingerprint image blur can be suppressed. That is, both the blur and the distortion can be greatly reduced.

The position and size of the fingerprint image on the imaging plane I-J can be adjusted by adjusting the position of the pinhole PH in the back-and-forth direction (Z direction), the lateral direction (X direction), and the vertical direction (Y direction). With the use of this scheme, an increase in parts assembly tolerance and reductions in cost, weight, and size can be attained as compared with the scheme using the lens.

Practical Example

Figure 2:
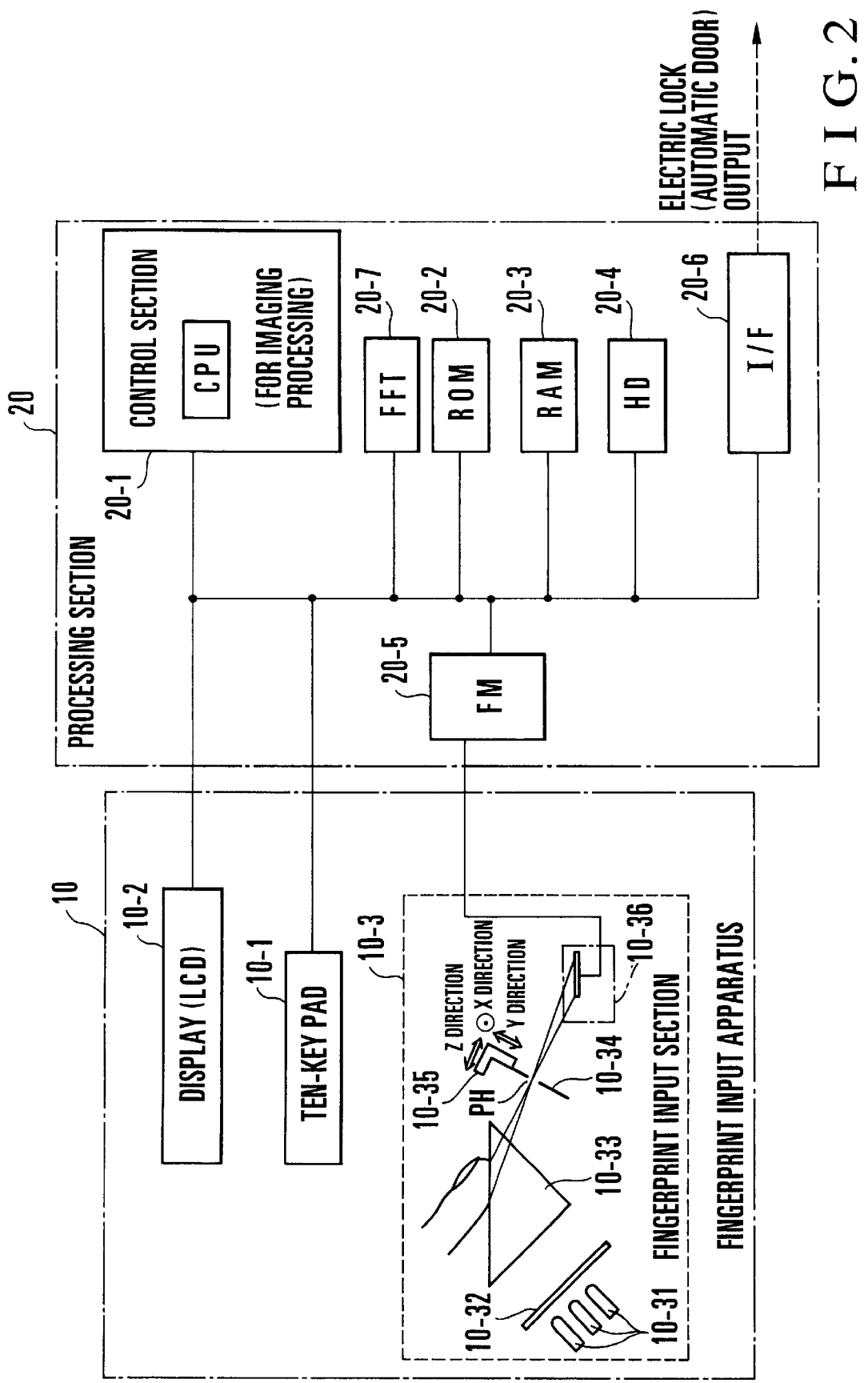
FIG. 2 is a block diagram showing a fingerprint collation system using this fingerprint input apparatus.

FIG. 2 shows the arrangement of a fingerprint collation system using a fingerprint input apparatus based on the principle described above. Referring to FIG. 2, reference numeral 10 denotes a fingerprint input apparatus; and 20, a processing section. The fingerprint input apparatus 10 includes a ten-key pad 10-1, a display (LCD) 10-2, and a fingerprint input section 10-3. The processing section 20 includes a control section 20-1 having a CPU, a ROM 20-2, a RAM 20-3, a hard disk (HD) 20-4, a frame memory (FM) 20-5, an external connection section (I/F) 20-6, and a Fourier transform section (FFT) 20-7. Registration and collation programs are stored in the ROM 20-2.

Figure 3A:
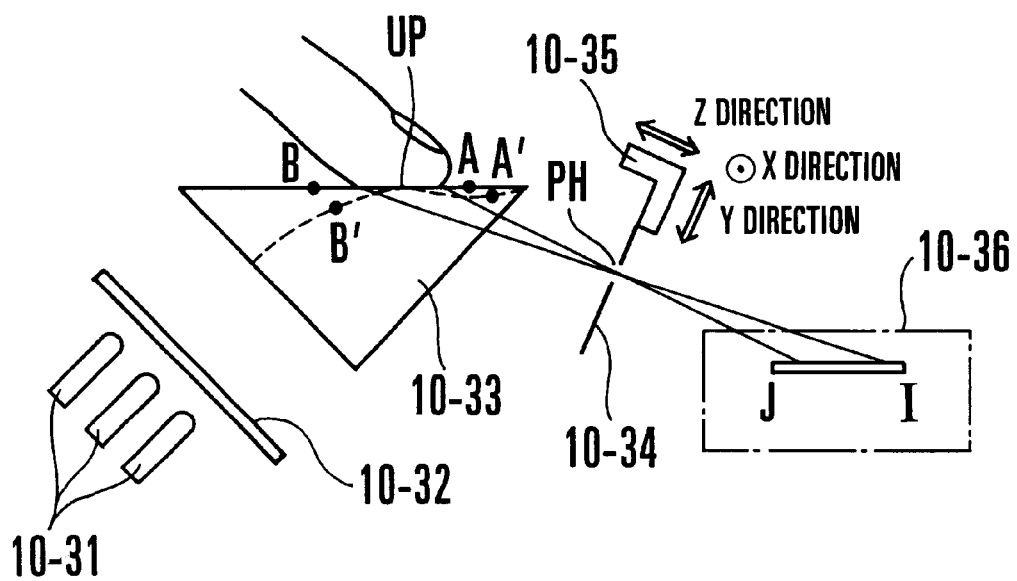
FIGS. 3A and 3B are enlarged views showing a fingerprint input section (total reflection method) and a conventional fingerprint input section corresponding thereto.

In the fingerprint input apparatus 10, as shown in the enlarged view in FIG. 3A, the fingerprint input section 10-3 includes a light source (LED) 10-31, a diffusion plate 10-32, a prism 10-33, a pinhole plate 10-34, a pinhole position adjusting mechanism 10-35, and a light-receiving unit 10-36.

In this case, a total reflection method is used,for the fingerprint input section 10-3 such that the LED 10-31 is placed on the left side of the lower surface side of the prism 10-33, and light from the LED 10-31 is irradiated on a fingerprint collection surface A-B of the prism 10-33 through the prism 10-33. In this arrangement, as is obvious, a surface equivalent to the fingerprint collection surface A-B when the prism 10-33 is substituted by air is set as an optical fingerprint collection surface A'-B' (a curved surface A'-B' indicated by the dotted line in FIG. 3A), and this optical fingerprint collection surface A'-B' and an imaging plane I-J of the light-receiving unit 10-36 are set to be almost parallel to each other. That is, the straight line A'-B' and the imaging plane I-J are set to be parallel to each other.

Figure 4A:
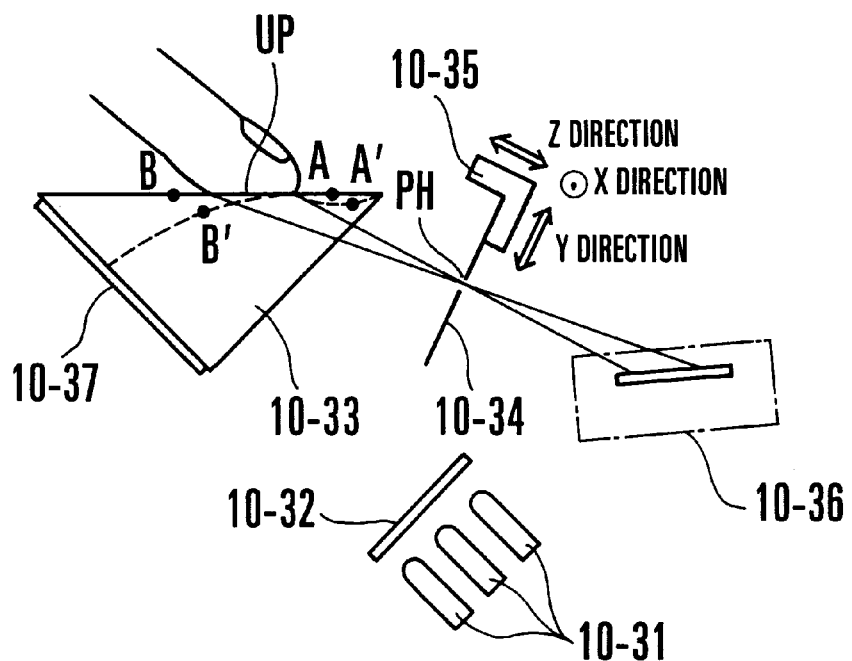
FIGS. 4A and 4B are enlarged views showing a fingerprint input section using the optical separation method and a conventional fingerprint input section corresponding thereto.

When an optical path separation method is to be used for the fingerprint input section 10-3, as shown in FIG. 4A, the LED 10-31 is placed on the right side of the lower surface side of the prism 10-33, and a black coating (or light-shielding plate) 10-37 is formed on the left-side surface of the prism 10-33 so that light from the LED 10-31 is irradiated on the fingerprint collection surface A-B through the prism 10-33. In this case as well, as is obvious, a surface equivalent to the fingerprint collection surface A-B when the prism 10-33 is substituted by air is set as an optical fingerprint collection surface A'-B' (a curved surface A'-B' indicated by the dotted line in FIG. 3A), and this optical fingerprint collection surface A'-B' and the imaging plane I-J of the light-receiving unit 10-36 are set to be almost parallel to each other. That is, the straight line A'-B' and the imaging plane I-J are set to be parallel to each other. The formation of the black coating (or light-shielding plate) 37 on the left-side surface of the prism 10-33 can prevent externally incident disturbance light from influencing the apparatus.

Figure 3B:
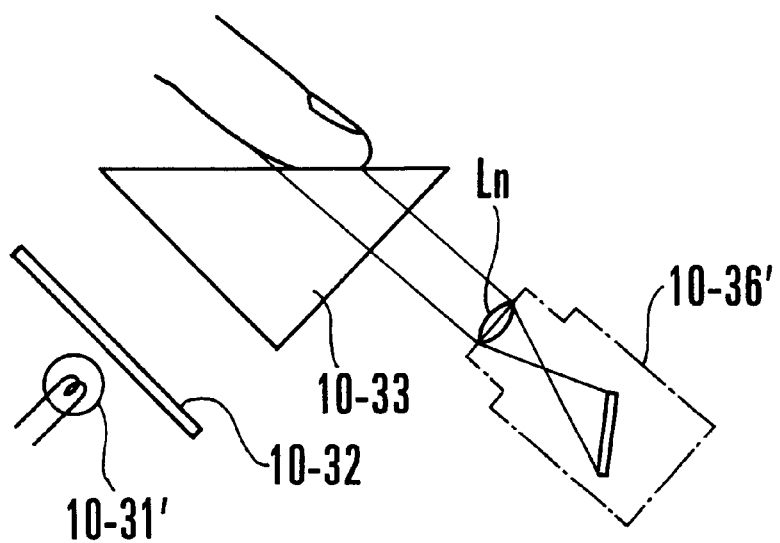
Figure 4B:
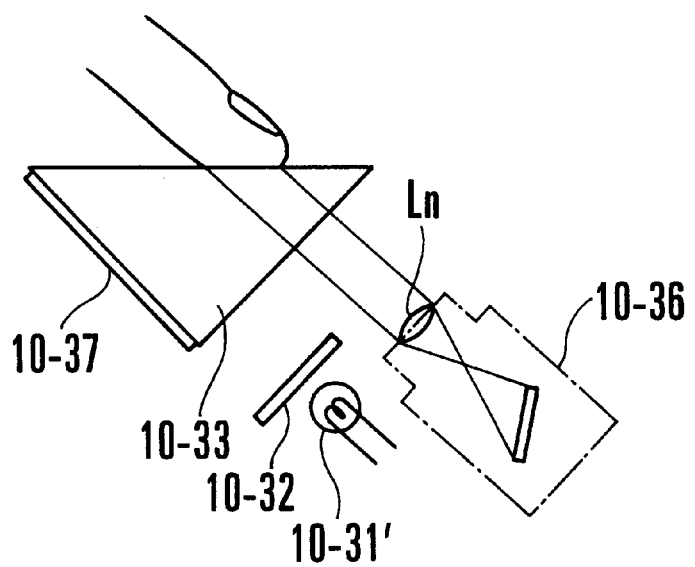

Since the principles of the total reflection method and the optical path separation method are described in detail in reference 1 (THE TRANSACTIONS OF THE INSTITUTE OF ELECTRONICS, INFORMATION AND COMMUNICATION ENGINEERS, 85/3, Vol. J68-D, No. 3, pp. 414–415), a detailed description thereof will be omitted. In the total reflection method, total reflection is caused on a non-contact portion of a fingerprint surface, while total reflection is prevented on a contact portion, and the difference between the light from the non-contact portion and that from the contact portion is detected. In the optical path separation method, only light from the contact portion of a fingerprint surface is detected without any light from the non-contact portion. For reference, FIGS. 3B and 4B respectively show the conventional arrangements of fingerprint input sections using the total reflection method and the optical path separation method. Each conventional arrangement uses an incandescent lamp 10-31' as a light source and a lens Ln for a light-receiving unit 10-36'.

FIGS. 5A and 5B show the fingerprint input apparatus 10. In this fingerprint input apparatus 10, the fingerprint collection surface A-B of the prism 10-33, i.e., an upper surface UP of the prism 10-33, is exposed, and a guide 10-41 is formed on a case 10-4 to allow an operator to put his/her finger on the upper surface UP of the prism 10-33 directly or indirectly (a film may be formed). The ten-key pad 10-1 and the display 10-2 are arranged side by side. The ten-key pad 10-1 has a fingerprint input confirmation key 10-11. Three-axis position adjusting knobs Cx, Cy, and Cz rotatably coupled to the pinhole position adjusting mechanism 10-35 are arranged on a side surface of the case 10-4.

[Registration of Fingerprint (Manual Pinhole Position Adjustment)]

Figure 7:
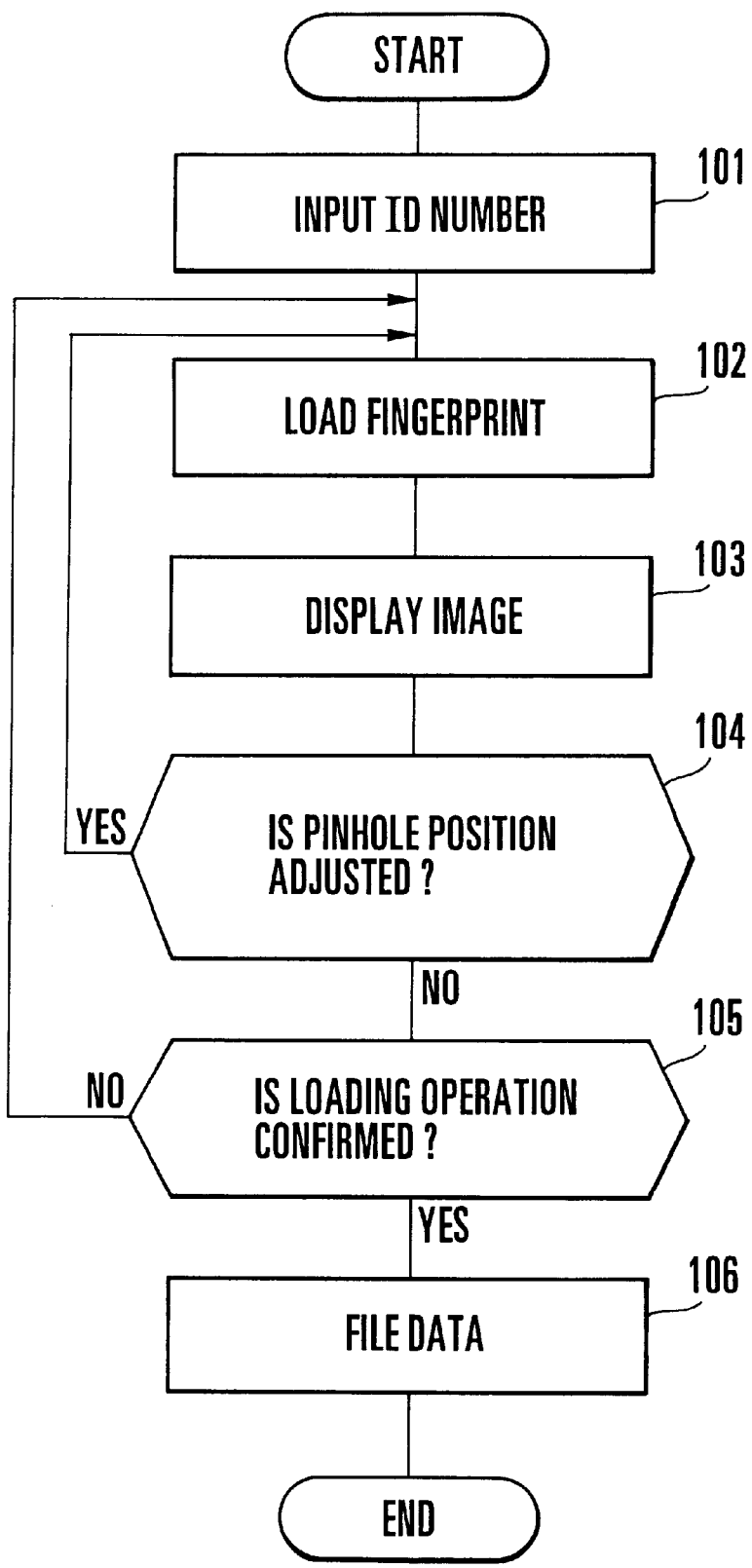
FIG. 7 is a flow chart for explaining a fingerprint registration process (manual pinhole position adjustment) in this fingerprint collation system.

In this fingerprint collation system, the fingerprint of a user is registered in the following manner. The user inputs an ID number assigned to him/her by using the ten-key pad 10-1 before using the system (step 101 in FIG. 7). The user then puts his/her finger on the upper surface UP (fingerprint collection surface A-B) of the prism 10-33 along the guide 10-41 of the fingerprint input apparatus 10. Light from the LED 10-31 has been irradiated on the fingerprint collection surface A-B of the prism 10-33, so the light from the LED 10-31 is totally reflected by the recess portions (groove portions) of the skin surface which are not in contact with the fingerprint collection surface A-B. In contrast to this, at the projection portions (ridge portions) of the skin surface which are in contact with the fingerprint collection surface A-B, the total reflection conditions are not satisfied, so the light from the LED 10-31 is scattered.

The light reflected by the skin surface of the finger placed on the fingerprint collection surface A-B and emerging from the prism 10-33 passes through the pinhole PH and is formed into an image on the imaging plane I-J of the light-receiving unit 10-36. As a result, the fingerprint portion corresponding to the groove portions becomes bright, and the fingerprint portion corresponding to the ridge portions becomes dark. That is, a fingerprint image with a contrast is collected. The pattern of the collected fingerprint (registration fingerprint) is supplied as gray scale image data to the processing section 20.

The control section 20-1 loads the image data of the registration fingerprint from the fingerprint input apparatus 10 through the frame memory 20-5 (step 102) and displays it on the display 10-2 (step 103). FIG. 6A shows a display sample of this registration fingerprint. The user sees the fingerprint image displayed on the display 10-2 to determine whether to change the position of the pinhole PH.

If the user sees his/her fingerprint image displayed on the display 10-2 and determines that the fingerprint image is out of position or excessively large or small, he/she determines that the position of the pinhole PH must be changed. The user then adjusts the angular positions of the three-axis position adjusting knobs Cx, Cy, and Cz to adjust the position of the pinhole plate 10-34 in the X, Y, and Z directions, i.e., the position of the pinhole PH in the X, Y, and Z directions, through the pinhole position adjusting mechanism 10-35, thereby setting the fingerprint image on the display 10-2 to a desired position in a desired size (steps 102 to 104).

After the position and size of the fingerprint image on the display 10-2 are adjusted, the user depresses the fingerprint input confirmation key 10-11. With this operation, the control section 20-1 determines that loading of the registration fingerprint is confirmed (step 105), and the image data of the confirmed registration fingerprint is filed in the hard disk 20-4 in correspondence with the ID number (step 106).

[Collation of Fingerprints (Manual Pinhole Position Adjustment)]

Figure 8:
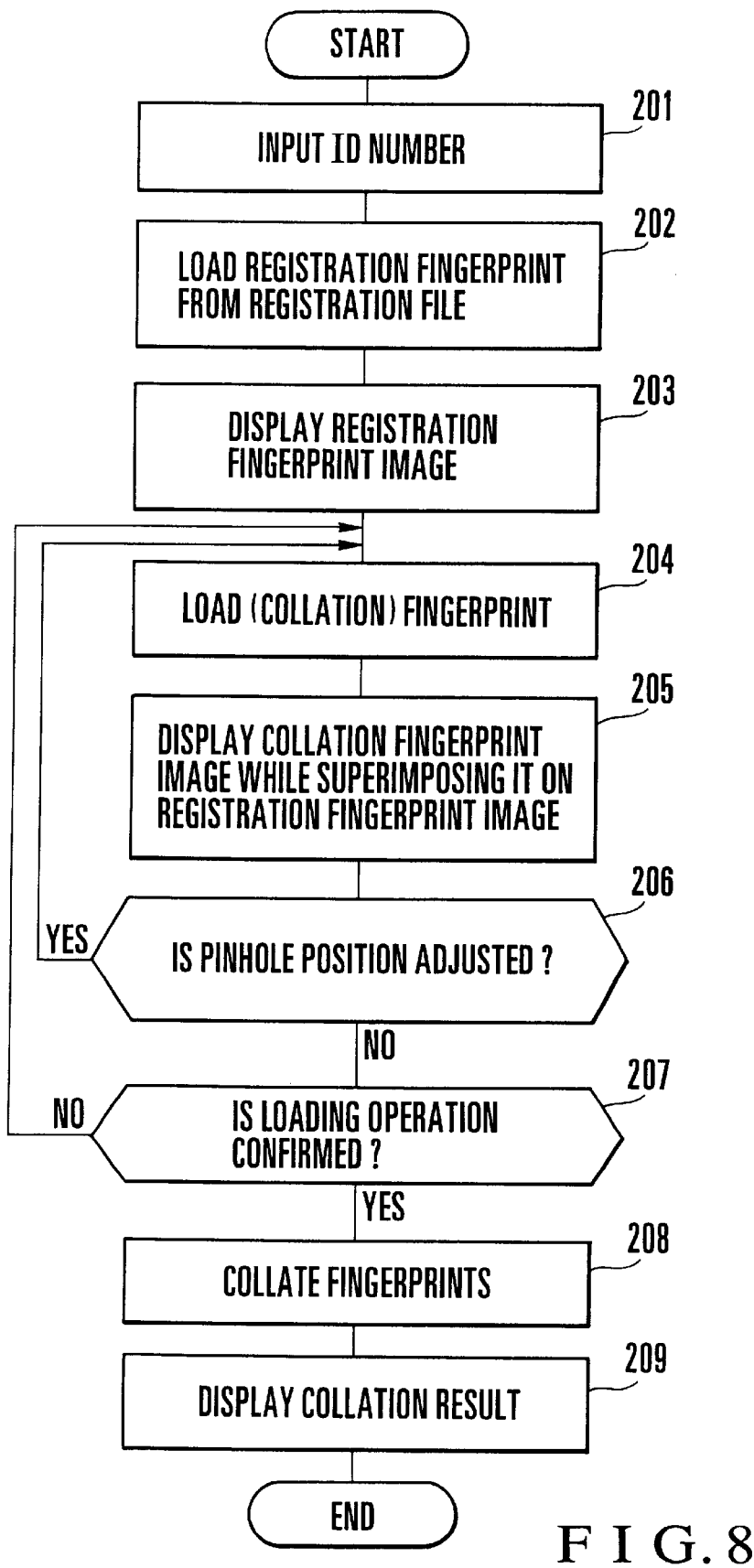
FIG. 8 is a flow chart for explaining a fingerprint collation process (automatic pinhole position adjustment) in this fingerprint collation system.

In this fingerprint collation system, collation of the fingerprint of the user is performed as follows. During the operation of the system, the user inputs an ID number assigned to him/her by using the ten-key pad 10-1 (step 201 in FIG. 8), and then puts his/her finger on the upper surface UP (fingerprint collection surface A-B) of the prism 10-33 along the guide 10-41 of the fingerprint input apparatus 10. With this operation, the pattern of the collected fingerprint (collation fingerprint) is supplied as halftone image data to the processing section 20 in the same manner as in the case of the registration of the fingerprint.

Upon reception of the ID number through the ten-key pad 10-1, the control section 20-1 reads out the image data of the registration fingerprint corresponding to the ID number from the registration fingerprints filed in the hard disk 20-4 (step 202), and displays it on the display 10-2 (step 203).

The control section 20-1 also loads the image data of the collation fingerprint from the fingerprint input apparatus 10 through the frame memory 20-5 (step 204), and displays it on the display 10-2 while superimposing it on the fingerprint image of the registration fingerprint (step 205). FIG. 6B shows a display sample in this case. The user sees this superimposed state of the fingerprint image of the registration fingerprint and the fingerprint image of the collation fingerprint displayed on the display 10-2 to determine whether to change the position of the pinhole PH.

If the user sees the fingerprint image of the collation fingerprint displayed on the display 10-2 and determines that this fingerprint image is out of position or excessively large or small with respect to the fingerprint image of the registration fingerprint, he/she determines that the position of the pinhole PH must be changed. The user then adjusts the angular Positions of the three-axis position adjusting knobs Cx, Cy, and Cz to adjust the position of the pinhole plate 10-34 in the X, Y, and Z directions, i.e., the position of the pinhole PH in the X, Y, and Z directions, through the pinhole position adjusting mechanism 10-35, thereby setting the fingerprint image of the collation fingerprint on the display 10-2 to a desired position in a desired size (steps 204 to 206).

After the position and size of the fingerprint image of the collation fingerprint on the display 10-2 are adjusted, the user depresses the fingerprint input confirmation key 10-11. With this operation, the control section 20-1 determines that loading of the collation fingerprint is confirmed (step 207). The fingerprint image of the confirmed collation fingerprint is collated with the fingerprint image of the previously readout registration fingerprint (step 208). The Collation result is then displayed on the display 10-2 (step 209).

In this embodiment, a blur and distortion can be greatly reduced according to the above basic Principle. In addition, the position and size of an input fingerprint image in a registration process can be set to a desired position and a desired size by manually adjusting the position of the pinhole PH with the three-axis position adjusting knobs Cx, Cy, and Cz. Furthermore, the positional offset between the input fingerprint images in registration and collation processes can be absorbed, and the difference between the sizes of the input fingerprint images can also be coped with.

Note that if a collected fingerprint image is small, the area of the background becomes large, resulting in a deterioration in collation precision. Such a deterioration in collation precision can be prevented by moving the pinhole PH in the Z direction (in which the pinhole PH moves apart from the imaging plane I-J) to increase the collected fingerprint image. In addition, positioning at the time of shipment can be performed without dismantling the apparatus, and hence a positioning process at the time of shipment can be facilitated.

Figure 9:
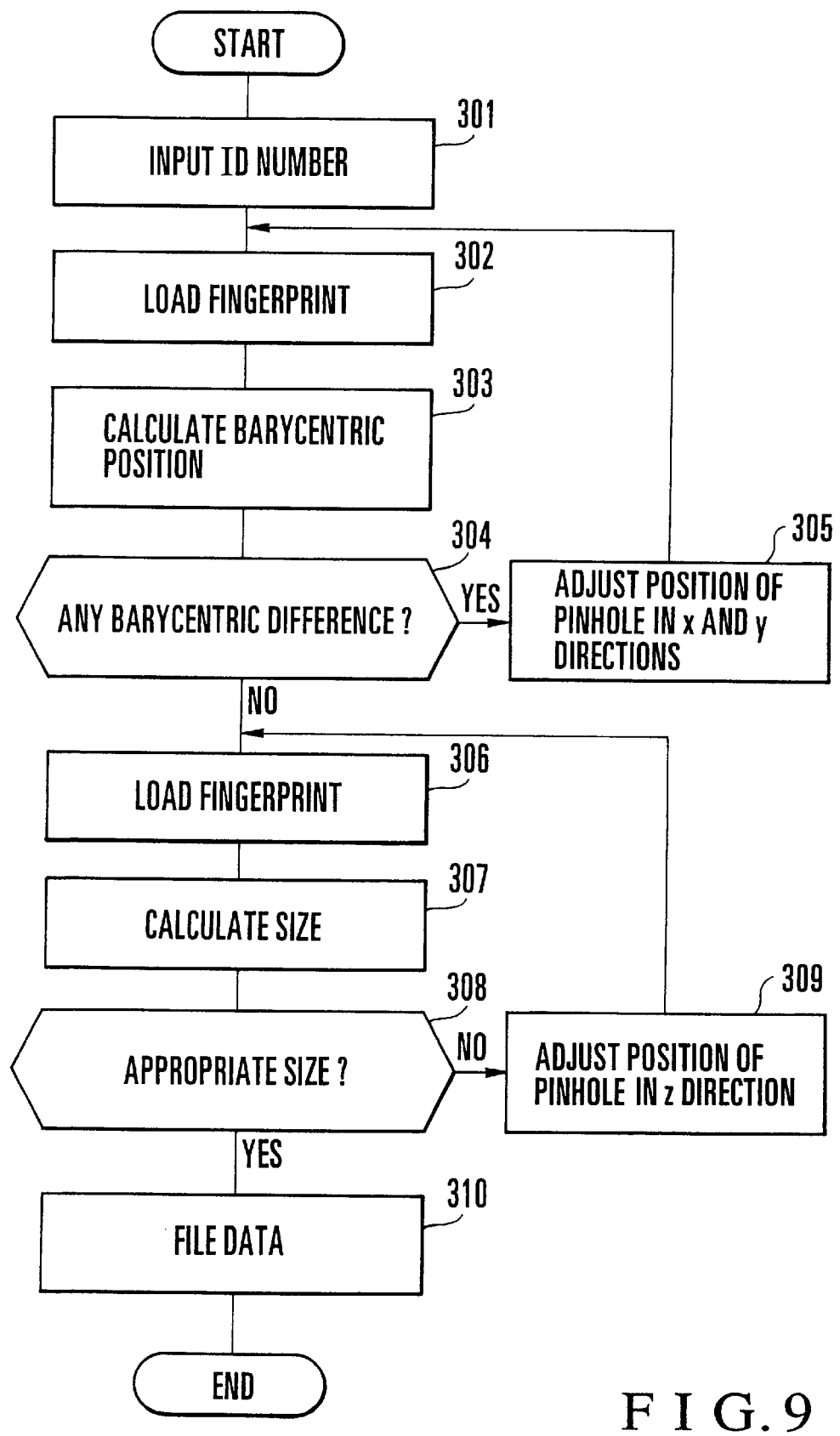
FIG. 9 is a flow chart for explaining a fingerprint registration process (automatic pinhole position adjustment) in this fingerprint collation system.
Figure 10:
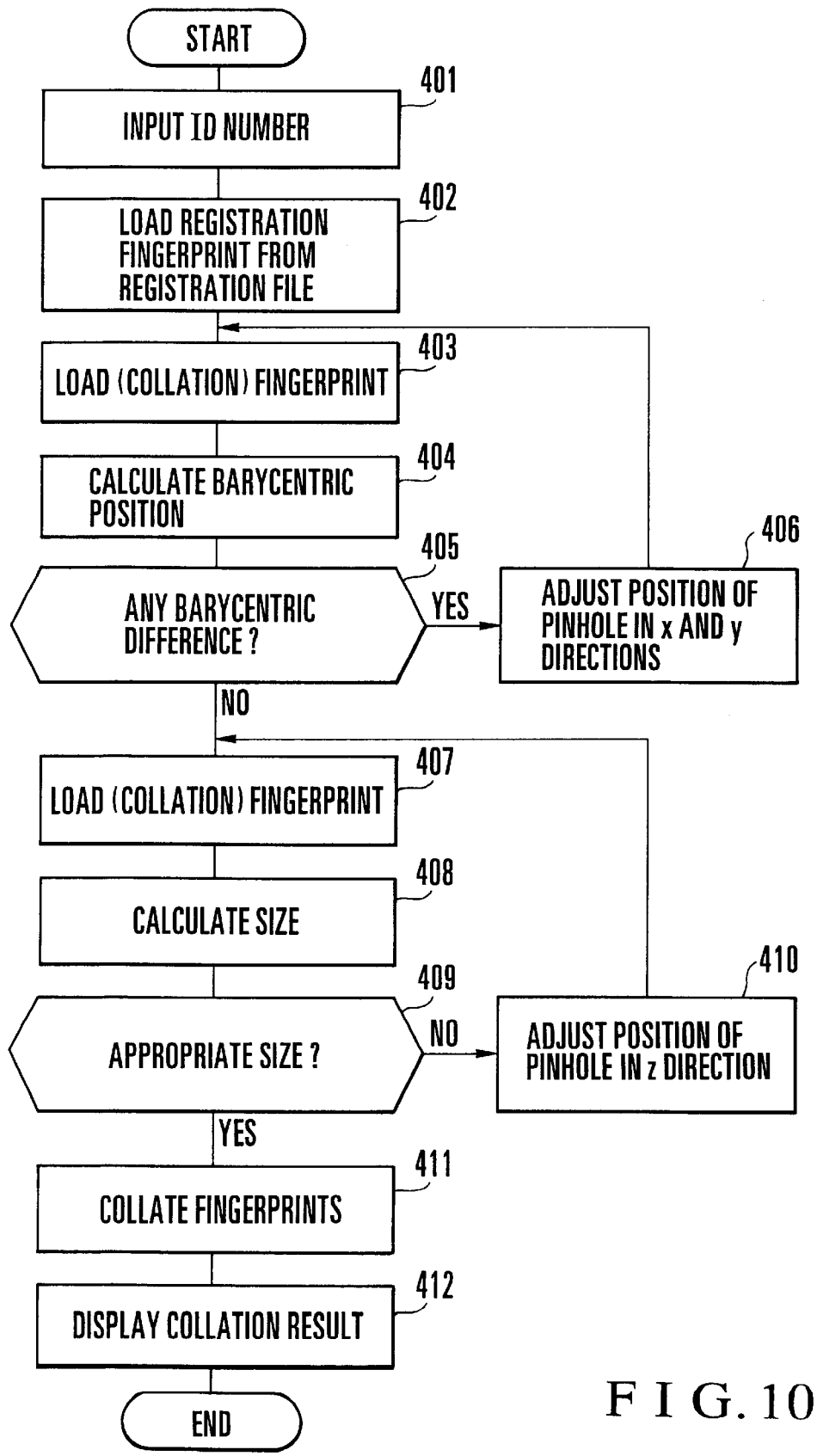
FIG. 10 is a flow chart for explaining a fingerprint collation process (automatic pinhole position adjustment) in this fingerprint collation system.

In the above embodiment, the position of the pinhole PH is manually adjusted with the three-axis position adjusting knobs Cx, Cy, and Cz in registration and collation processes. This position, however, may be automatically adjusted. FIGS. 9 and 10 show operations to be performed in registration and collation processes when the position of the pinhole PH is automatically adjusted.

[Registration of Fingerprint (Automatic Adjustment of Pinhole Position)]

In this case, the user inputs an ID number assigned to him/her by using the ten-key pad 10-1 (step 301 in FIG. 9). The user then puts his/her finger on the upper surface UP (fingerprint collection surface A-B) of the prism 10-33 along the guide 10-41 of the fingerprint input apparatus 10. Light reflected by the pattern surface of the finger placed on the fingerprint collection surface A-B and emerging from the prism 10-33 passes through the pinhole PH and is formed into an image on the imaging plane I-J of the light-receiving unit 10-36. With this operation, the fingerprint portion corresponding to the groove portions becomes bright, and the fingerprint portion corresponding to the ridge portions becomes dark. That is, a fingerprint image with a contrast is collected. The pattern of the collected fingerprint (registration fingerprint) is supplied as halftone image data to the processing section 20.

The control section 20-1 loads the image data of the registration fingerprint from the fingerprint input apparatus 10 through the frame memory 20-5 (step 302). The control section 20-1 then calculates the barycentric position of the loaded image data of the registration fingerprint (step 303). In this case, the barycentric position is calculated in the following manner.

Figures 11A, 11B:
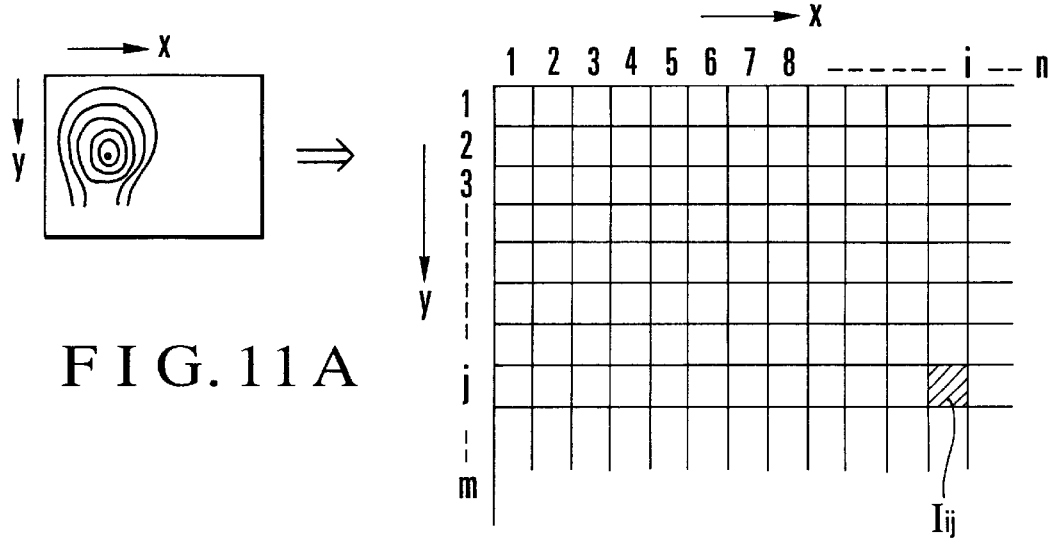
FIGS. 11A and 11B are views for explaining how a barycentric position is calculated in automatic pinhole position adjustment.

First of all, the loaded image data (FIG. 11A) of the registration fingerprint is divided into n x m pixels (FIG. 11B). That is, the loaded image data of the registration fingerprint is divided into n pixels in the x direction and m pixels in the y direction. Letting $I_{ij}$ be the light intensity at the position of the ijth pixel, x- and y-coordinates xa and ya of the barycenter are obtained according to equations (1) and (2):

$$xa = \left(\sum_{i}^{n}\sum_{j}^{m} iI_{ij}\right) \bigg/ \left(\sum_{i}^{n}\sum_{j}^{m} I_{ij}\right) \qquad (1)$$

-continued $$ya = \left(\sum_{i}^{n}\sum_{j}^{m} jI_{ij}\right) / \left(\sum_{i}^{n}\sum_{j}^{m} J_{ij}\right) \quad (2)$$

$$(xa, ya) = \left\{\left(\sum_{i}^{n}\sum_{j}^{m} iI_{ij}\right) / \left(\sum_{i}^{n}\sum_{j}^{m} I_{ij}\right), \left(\sum_{i}^{n}\sum_{j}^{m} jI_{ij}\right) / \left(\sum_{i}^{n}\sum_{j}^{m} J_{ij}\right)\right\} \quad (3)$$

The control section 20-1 obtains the difference (xa−xs, ya−ys) between the obtained barycentric position (xa, ya) and the set barycentric position (xs, ys) as a barycentric difference, and checks whether there is a barycentric difference (step 304). If there is a barycentric difference (barycentric difference ≠0), the control section 20-1 adjusts the position of the pinhole PH in the X and Y directions through the pinhole position adjusting mechanism 10-35 so as to eliminate the barycentric difference (step 305).

When the barycentric difference is eliminated, since NO is obtained in step 304, the control section 20-1 causes the flow to advance to step 306 to load the image data of the registration fingerprint as the image data of the registration fingerprint whose positions in the X and Y directions are confirmed (step 306). The control section 20-1 calculates the size of the loaded image data of the registration fingerprint (step 307). In this case, the size is calculated in the following manner.

Figures 12A, 12B:
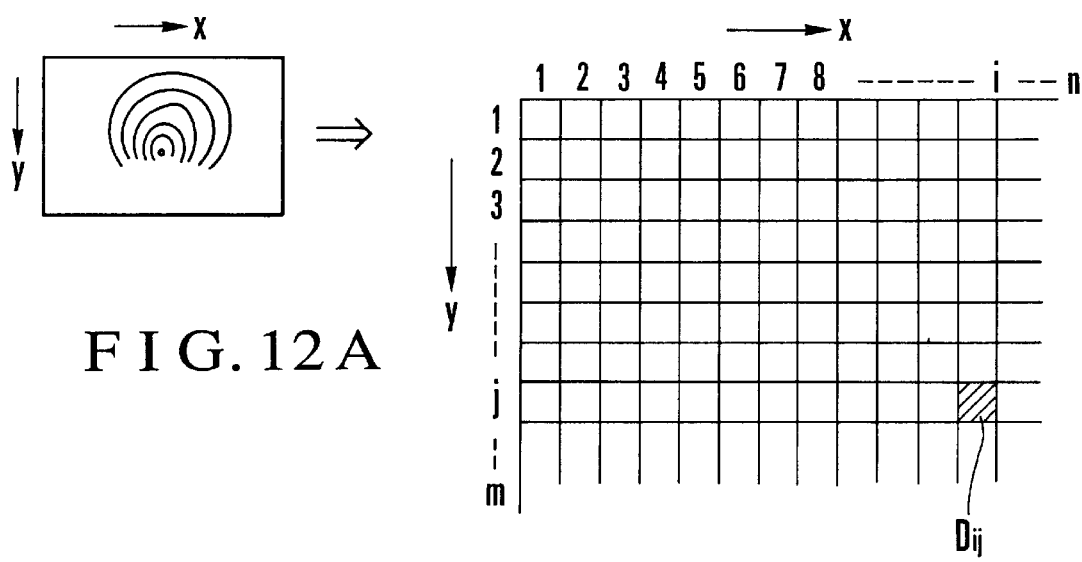
FIGS. 12A and 12B are views for explaining how a size is calculated in automatic pinhole position adjustment.

First of all, the image data (FIG. 12A) of the registration fingerprint whose positions in the X and Y directions are confirmed is divided into n x m pixels (FIG. 12B). That is, the loaded image data of the registration fingerprint is divided into n pixels in the x direction and m pixels in the y direction. Each pixel is then binarized according to its light level such that each portion with light is represented by "1", and each of the remaining portions is represented by "0". The light intensity of each pixel after binarization is represented by $D_{ij}$="0" or "1", and an area Sa is expressed by the following equation:

$$Sa = \sum_{ij}^{nm} D_{ij} \quad (4)$$

The control section 20-1 compares this area Sa with a set area Ss to check whether the area Sa is appropriate (step 308). If the area Sa is not appropriate (Sa≠Ss), the control section 20-1 adjusts the position of the pinhole PH in the Z direction through the pinhole position adjusting mechanism 10-35 to set the area Sa to an appropriate value (step 309). If Sa−Ss>0, the control section 20-1 moves the position of the pinhole PH to reduce the fingerprint image. If Sa—Ss<0, the control section 20-1 moves the position of the pinhole PH to enlarge the fingerprint image.

When the area Sa is set to an appropriate value with this operation, since YES is obtained in step 308, the control section 20-1 causes the flow to advance to step 310 to file the corresponding image data of the registration fingerprint as the image data of the registration fingerprint whose positions in the X, Y, and Z directions are confirmed in the hard disk 20-4 in correspondence with the ID number (step 310).

[Collation of Fingerprints (Automatic Adjustment of Pinhole Position)]

During the operation of the apparatus, the user inputs an ID number assigned to him/her by using the ten-key pad 10-1 (step 401 in FIG. 10), and puts his/her finger on the upper surface UP (fingerprint collection surface A-B) of the prism 10-33 along the guide 10-41 of the fingerprint input apparatus 10. As in the case of the registration of the fingerprint, the pattern of the collected fingerprint (collation fingerprint) is supplied as halftone image data to the processing section 20.

Upon reception of the ID number through the ten-key pad 10-1, the control section 20-1 reads out the image data of the registration fingerprint corresponding to the ID number from the registration fingerprints filed in the hard disk 20-4 (step 402). The control section 20-1 loads the image data of the collation fingerprint from the fingerprint input apparatus 10 through the frame memory 20-5 (step 403). The control section 20-1 then calculates the barycentric position of the loaded image data of the collation fingerprint in the same manner as in the case of the registration fingerprint (step 404).

The control section 20-1 obtains the difference (xb−xs, yb−ys) between the calculated barycentric position (xb, yb) and the set barycentric position (xs, ys) to check whether there is a barycentric difference (step 405). If there is a barycentric difference (barycentric difference≠0), the control section 20-1 adjusts the position of the pinhole PH in the X and Y directions through the pinhole position adjusting mechanism 10-35 (step 406).

When the barycentric difference is eliminated with this operation, since NO is obtained in step 405, the control section 20-1 causes the flow to advances to step 407 to load the image data of the collation fingerprint as the image data of a collation fingerprint whose positions in the X and Y directions are confirmed (step 407). The control section 20-1 then calculates the size of the loaded image data of the collation fingerprint in the same manner as in the case of the registration fingerprint (step 408).

The control section 20-1 compares the calculated area Sb of the image data of the collation fingerprint, whose positions in the X and Y directions are confirmed, with the set area Ss to check whether the area Sb is appropriate (step 409). If the area Sb is not appropriate (Sb≠Ss), the control section 20-1 adjusts the position of the pinhole PH in the Z direction through the pinhole position adjusting mechanism 10-35 to set the area Sb to an appropriate value (step 410). That is, if Sb−Sb>0, the control section 20-1 moves the position of the pinhole PH to reduce the fingerprint image. If Sb−Ss<0, the control section 20-1 moves the position of the pinhole PH to enlarge the fingerprint image.

When the area Sb is set to an appropriate value with this operation (Sb=Ss), since YES is obtained in step 409, the control section 20-1 causes the flow to advance to step 411 to set the fingerprint image as the fingerprint image of the collation fingerprint whose positions in the X,,Y, and Z directions are confirmed, and collate the fingerprint image of the collation fingerprint with the previously readout fingerprint image of the registration fingerprint (step 411). The control section 20-1 displays this collation result on the display 10-2 (step 412).

Although position adjustment in the Z direction is performed after position adjustment in the X and Y directions according to the flow chart shown in FIGS. 9 and 10, position adjustment in the X and Y directions may be performed after position adjustment in the Z direction.

Furthermore, according to the principle of the above embodiment, the optical fingerprint collection surface A'-B' is set to be parallel to the imaging plane I-J. This operation is based on the assumption that there is no distortion between the fingerprint collection surface A-B and the optical fingerprint collection surface A'-B'. Distortion, however, may be caused between the fingerprint collection surface A-B and the optical fingerprint collection surface A'-B' depending on the positions and angles of the fingerprint collection surface A-B and a prism surface R-S (FIG. 1B).

Figure 13A:
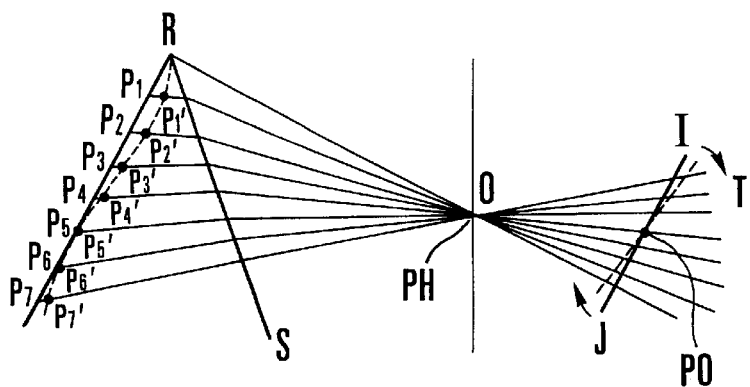
FIGS. 13A to 13C are views for explaining measures to reduce distortion between a fingerprint collection surface A-B and an optical fingerprint collection surface A'-B'.
Figure 13B:
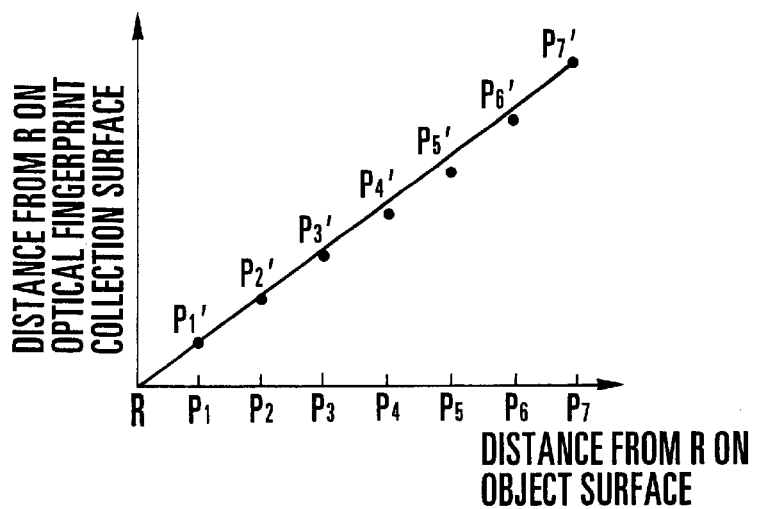

In the optical system shown in FIG. 13A, if, for example, points $P_1$ to $P_7$ set at equal intervals on the fingerprint collection surface A-B are matched with points $P_1'$ to $P_7'$ on the optical fingerprint collection surface A'-B', the points $P_1'$ to $P_7'$ on the optical fingerprint collection surface A'-B' are not set at equal intervals, and distortion occurs. In this case, even if the optical fingerprint collection surface A'-B' is set to be parallel to the imaging plane I-J, only the distortion caused on the optical fingerprint collection surface A'-B' cannot be eliminated.

Figure 13C:
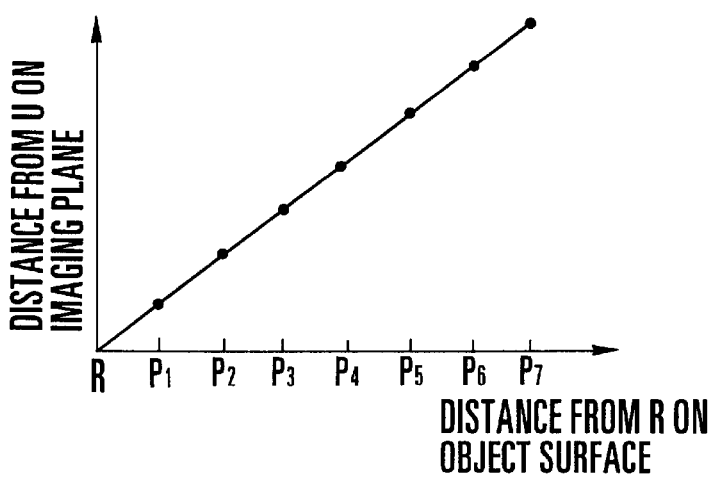

For this reason, in such a case, i.e., when the optical fingerprint collection surface A'-B' has distortion with respect to the fingerprint collection surface A-B, the imaging plane I-J is rotated about a point PO through a predetermined angle to set an imaging plane U-T (see FIG. 13A) so as to eliminate the distortion of the optical fingerprint collection surface A'-B'. With this operation, as shown in FIG. 13C, the distortion caused on the fingerprint collection surface A-B can be greatly reduced.

Figure 14:
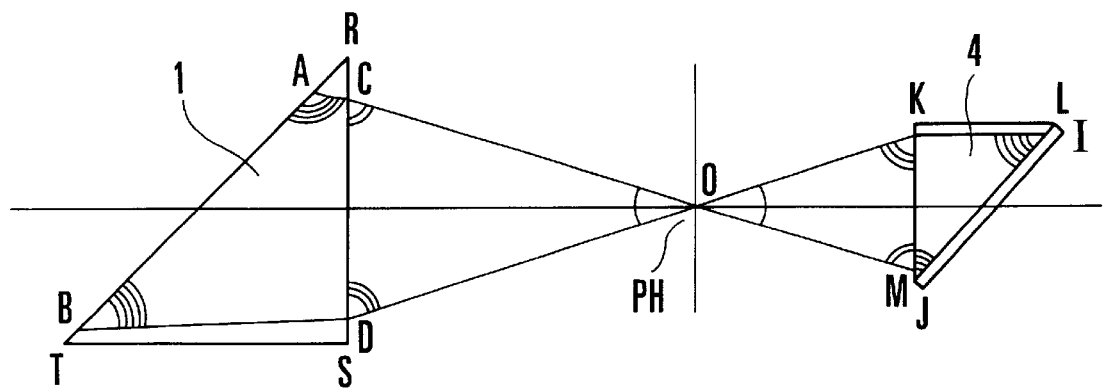
FIG. 14 is a view for explaining measures to completely eliminate distortion caused when the optical fingerprint collection surface A'-B' is a curved surface.

In the above embodiment, since the optical fingerprint collection surface A'-B' is a curved surface, it is difficult to perfectly eliminate its distortion. With the arrangement shown in FIG. 14, however, the distortion can be perfectly eliminated.

A second prism 4 is placed in front of the imaging plane I-J. The fingerprint collection surface A-B of the first prism 1 is set to be parallel to the imaging plane I-J, and the fingerprint collection surface A-B of the first prism-l is set to be parallel to a surface L-M of the second prism 4 on the imaging plane side. An exit surface C-D of the first prism 1 with respect to the pinhole PH is set to be parallel to an incident surface K-M of the second prism 4 with respect to the pinhole PH. In this case, the surface L-M of the second prism 4 is placed above the imaging plane I-J.

With this arrangement, the optical system on the first prism 1 side is set to be similar to the optical system on the second prism 4 side with the pinhole PH (point O) being the center, thereby perfectly eliminating the distortion. That is, the blur and the distortion can be eliminated at once. Note that some deviations are allowed for the parallelisms between the fingerprint collection surface A-B and the imaging plane I-J, between the fingerprint collection surface A-B and surface L-M, between the exit surface C-D and the incident surface K-M.

Figure 15:
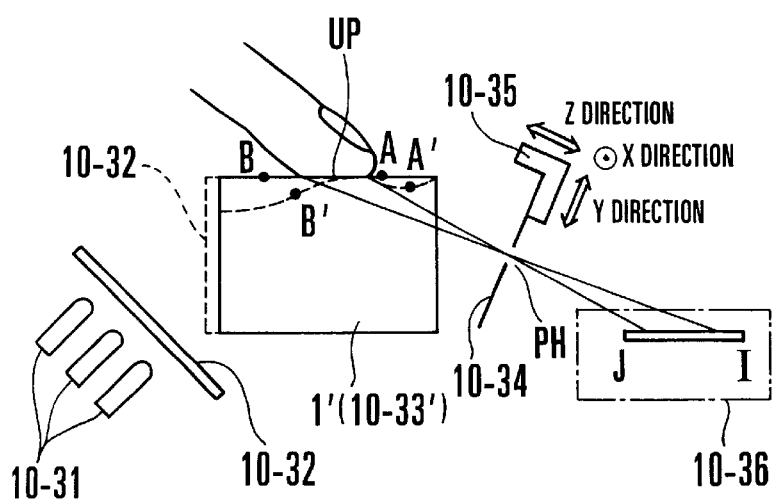
FIG. 15 is an enlarged view showing a fingerprint input section (total reflection method) using a rectangular prism.

In the above embodiment, a triangular prism is used as the prism 1 (10-33). However, a rectangular prism 1' (10-33') like the one shown in FIG. 15 may be used. Various other types of prisms may be used. Note that the diffusion plate 10-32 may be mounted on the prism 1' (10-33') side, as indicated by the dotted line.

Note that the prism is defined as an optical element having two or more flat surfaces and using refraction and reflection of light. The functions of the prism are defined as functions ① to ③ as follows.

① One or more reflection functions are combined into one block, and deflection and movement of optical paths are realized within a compact arrangement.

② The direction of light is changed or the direction (azimuth) of an image is adjusted by using refraction of light.

③ The spectrum of light is analyzed by using dispersion of an optical material.

In the above embodiment, the total reflection method is used for the fingerprint input section 10-3. Even if the optical separation method is used, however, the same operations described above can be applied to the resultant arrangement. It cannot be said that one of the total reflection method and the optical path separation method is superior to the other.

Embodiment 2

Eighth Aspect

In Embodiment 1 (see FIG. 1A), the diameter of the pinhole PH must be decreased to some degree to increase the resolution of a fingerprint image. For this reason, the light intensity of a fingerprint image formed on the imaging plane I-J decreases. To compensate for this, the intensity of light from a light source which is irradiated on the fingerprint collection surface A-B must be increased. As a result, the service life of the light source itself is shortened because of the heat generated by the light source, or the light transmitted through the prism 1 is too bright for the user, thus posing new problems. To solve such problems, a near infrared light-emitting diode may be used as a light source. In this case, although glaring can be suppressed, the problem of the generation of heat cannot be solved.

The present applicant, therefore, has proposed an arrangement in which a lens 5-2 is placed near the rear surface of a pinhole plate 5-1, as shown in FIG. 17, to increase the light intensity of a fingerprint image formed on an imaging plane 5-3 without increasing the intensity of light from a light source 6. In this arrangement, when a straight line connecting the center of a fingerprint collection surface 1-1 and the center of the imaging plane 5-3 is an optical axis, the central axis of the lens 5-2 is made to coincide with the optical axis. In addition, since a blur occurs owing to the lens 5-2, the inclination of the imaging plane 5-3 with respect to the optical axis is adjusted to prevent the blur. Referring to FIG. 17, reference numeral 1-2 denotes a black coating (or light-shielding plate) formed on the left-side surface of a prism 1.

In this arrangement, however, trapezoidal distortion occurs at the imaging plane 5-3. More specifically, if an object in the form of a square lattice, like the one shown in FIG. 18A, is placed on the fingerprint collection surface 1-1, the resultant image on the imaging plane 5-3 has trapezoidal distortion like the one shown in FIG. 18B. Referring to FIG. 19, letting A-B be the fingerprint collection surface, O be the center of the pinhole, a-b be the imaging plane, X be an arbitrary point on the fingerprint collection surface A-B, and x be the point at which the point X is projected on the imaging plane a-b, an image magnification m at the point x is given by m=Ox/OX. That is, the image magnification is determined by the ratio of a line segment Ox to a line segment OX. In this case, since a triangle OAB is not similar to a triangle Oab, and a line segment OA is shorter than a line segment OB, the image on the point A side becomes large, whereas the image on the point B side becomes small. This trapezoidal distortion increases as the ratio of OA:OB increases. As the size of the fingerprint input apparatus decreases, the distance between the fingerprint collection surface and the lens must be decreased. If this distance is decreased, the ratio of OA:OB increases, resulting in greater trapezoidal distortion.

In Embodiment 2, therefore, the light intensity of a fingerprint image formed on the imaging plane 5-3 can be increased without increasing the light intensity of the light source 6, and the occurrence of trapezoidal distortion is greatly suppressed under the condition in which a blur is suppressed, thereby obtaining a high-quality fingerprint image.

Embodiment 2-1

Barrel Distortion

Figure 20A:
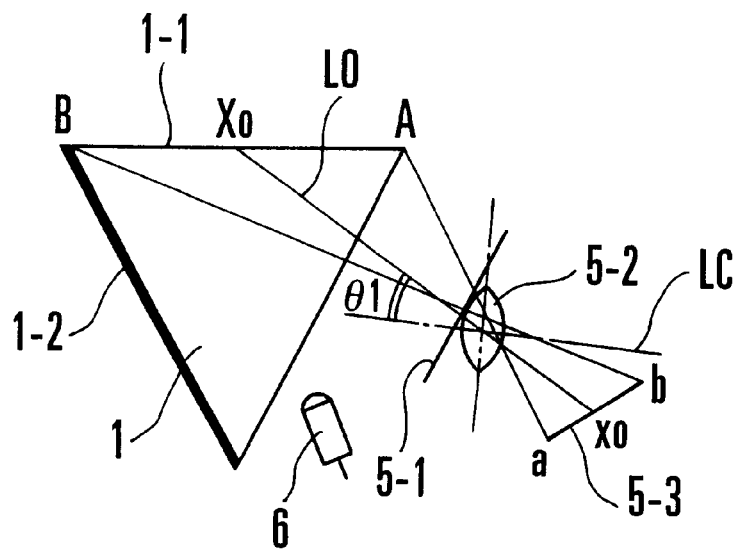
FIGS. 20A and 20B are views showing the main part (Embodiment 2) of a fingerprint input apparatus according to the present invention.

FIG. 20A shows the main part of a fingerprint input apparatus according to the present invention (Embodiment 2-1). In this embodiment, a lens having barrel distortion (negative distortion) is used as a lens 5-2. A central axis LC of the lens 5-2 is inclined, by θ1, to the B point side on the fingerprint collection surface A-B side with respect to an optical axis LO (a straight line connecting a center $x_o$ of a fingerprint collection surface A-B and a center $x_o$ of an imaging plane a-b). In addition, to prevent a blur, the inclination of the imaging plane a-b with respect to the optical axis LO is adjusted.

With this operation, trapezoidal distortion (see FIG. 21A) caused when light from the fingerprint collection surface A-B passes through a region on the lens axis indicated by the hatching in FIG. 21B, and a central axis LC of the lens 5-2 is made to coincide with the optical axis LO is corrected by the barrel distortion unique to the lens 5-2, and an image of the finger placed on the fingerprint collection surface A-B is formed on the imaging plane a-b while the trapezoidal distortion is greatly suppressed.

In this case, since the light intensity of a fingerprint image formed on the imaging plane a-b by the lens 5-2 is increased, the intensity of light from a light source 6 need not be increased, thereby preventing shortening of the service life of the light source 6 due to the generation of heat and glaring of light transmitted through a prism 1. Furthermore, a blur is suppressed by adjusting the inclination of the imaging plane a-b with respect to the optical axis LO, and trapezoidal distortion under the condition in which this blur is suppressed is suppressed by inclining the central axis LC of the lens 5-2 by θ1 with respect to the optical axis LO, thereby obtaining a high-quality fingerprint image.

Embodiment 2-2

Pincushion Distortion

Figure 20B:
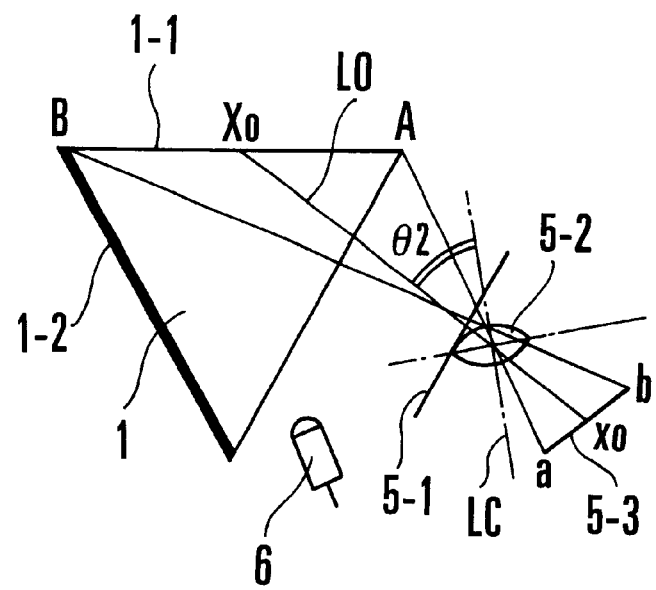

FIG. 20B shows the main part of a fingerprint input apparatus according to the present invention (Embodiment 2-2). In this embodiment, a lens having pincushion distortion (positive distortion) is used as a lens 5-2. A central axis LC of the lens 5-2 is inclined, by θ2, to the point A side on a fingerprint collection surface A-B with respect to an optical axis LO. In addition, to prevent a blur, the inclination of an imaging plane a-b is adjusted with respect to the optical axis LO.

With this operation, trapezoidal distortion (see FIG. 22B) caused when light from the fingerprint collection surface A-B passes through a region on the lens axis indicated by the hatching in FIG. 22B, and a central axis LC of the lens 5-2 is made to coincide with the optical axis LO is corrected by the pincushion distortion unique to the lens 5-2, and an image of the finger placed on the fingerprint collection surface A-B is formed on the imaging plane a-b while the trapezoidal distortion is greatly suppressed.

In this case, since the light intensity of a fingerprint image formed on the imaging plane a-b by the lens 5-2 is increased, the intensity of light from a light source 6 need not be increased, thereby preventing shortening of the service life of the light source 6 due to the generation of heat and glaring of light transmitted through a prism 1. Furthermore, a blur is suppressed by adjusting the inclination of the imaging plane a-b with respect to the optical axis LO, and trapezoidal distortion under the condition in which this blur is suppressed is suppressed by inclining the central axis LC of the lens 5-2 by θ2 with respect to the optical axis LO, thereby obtaining a high-quality fingerprint image.

As described above, there are two types of distortion, i.e., barrel distortion and pincushion distortion. The method of correcting trapezoidal distortion is equal in effect to the method of correcting trapezoidal distortion by using pincushion distortion; it cannot be said that one of the methods is superior to the other. In this embodiment, the pinhole serves to increase the degree of freedom in design. That is, since the pinhole is formed in front of the lens, the depth of focus of the lens increases, and a tolerance can be ensured for the angle defined by the imaging plane and the optical axis that causes no blur, thereby satisfactorily increasing the degree of freedom in design.

In this embodiment, the optical system of the fingerprint input apparatus is designed as follows:

① The prism is positioned.

② The angle of the optical axis and a distance therefrom are determined.

③ A lens is selected (the shape, focal length, and the like of a lens), and the lens is positioned on the optical axis.

④ A pinhole is selected (the diameter, depth of focus, and the like of a pinhole), and is positioned.

⑤ While the inclination angle of the imaging plane with respect to the optical axis is changed so as not to cause a blur, operations ③ and ④ are repeated, thereby selecting a lens, positioning the lens, selecting a pinhole, and positioning the pinhole.

⑥ An angle at which trapezoidal distortion is minimized is determined by changing the lens angle. Note that since a blur may occur on the imaging plane when the lens angle is changed, the position of the pinhole is adjusted to prevent the blur.

Embodiment 3

Ninth to 15th Aspects

Prior to a description of the ninth to 15th aspects of the present invention, the techniques on which these aspects are based will be described. A fingerprint input apparatus includes an optical system as a constituent, and a reduction in the size of the apparatus is required in consideration of the installation place, operability, and the like. The size of this fingerprint input apparatus can be effectively reduced by forming an optical system according to the optical path separation method and placing a light source and a prism close to each other.

Figure 23:
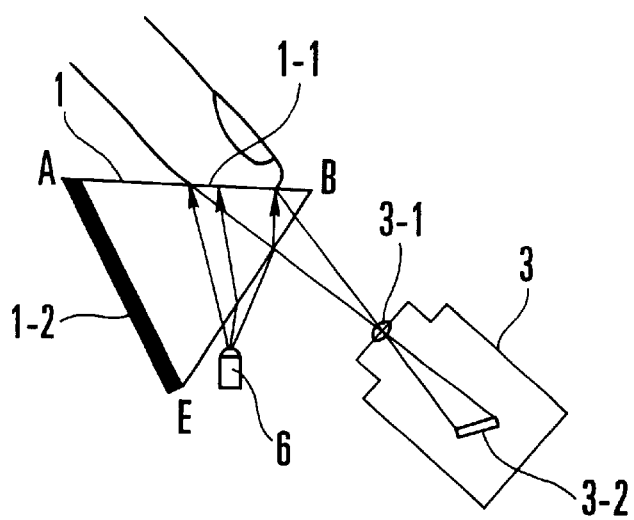
FIG. 23 is a view showing the main part of a fingerprint input apparatus using the optical path separation method on which Embodiment 3 is based.

FIG. 23 shows the main part of a conventional fingerprint input apparatus using the optical path separation method. Referring to FIG. 23, reference numeral 1 denotes a prism; 3, a light-receiving unit; and 6, a light source. The light source 6 is placed on the right side of the lower surface side of the prism 1. A black coating (or light-shielding plate) 1-2 is formed on the left-side surface of the prism 1 to irradiate light from the light source 6 on a fingerprint collection surface 1-1 through the prism 1. In this arrangement, light from the light source 6 is reflected by the pattern surface of a finger placed on the fingerprint collection surface 1-1 and emerges from the prism 1 to be formed into an image on an imaging plane (CCD) 3-2 through a lens 3-1. With the use of the optical separation method, the size of the fingerprint input apparatus can be reduced.

Figure 24:
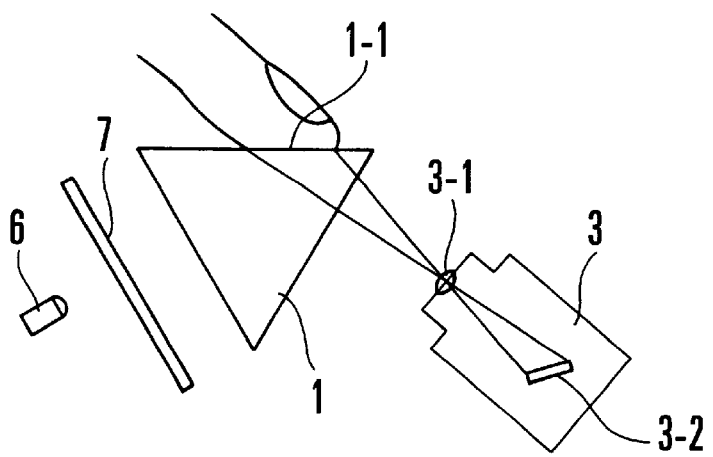
FIG. 24 is a view showing the main part of a fingerprint input apparatus using the total reflection method on which Embodiment 3 is based.

FIG. 24 shows the main part of a fingerprint input apparatus using the total reflection method. In this fingerprint input apparatus, a light source 6 is placed on the left side of the lower surface side of a prism 1, and light from the light source 6 is irradiated on a fingerprint collection surface 1-1 through a diffusion plate 7 and the prism 1. In this arrangement, as is apparent from comparison with FIG. 23, since the space for the light source 6 must be ensured on the left side of the lower surface side of the prism 1 (at the opposite position to the light-receiving unit 3), a reduction in the size of the apparatus is limited.

In contrast to this, the fingerprint input apparatus using the optical path separation method has an advantage in terms of a reduction in size. If, however, the light source 6 and the prism 1 are brought close to each other to further reduce the size, the incident angle on the illumination light incident surface of the prism 1 increases, and light is refracted and diffused. As a result, the fingerprint collection surface 1-1 of the prism 1 partly decreases in illuminance, leading to illuminance irregularity.

Figure 25:
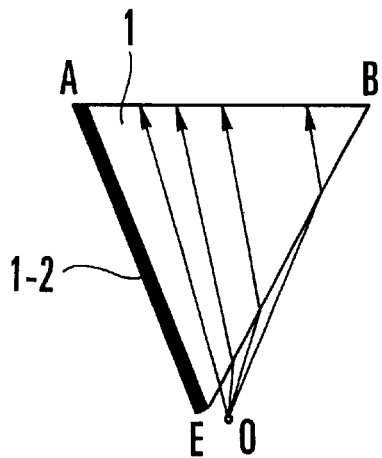
FIG. 25 is a view for explaining how illumination irregularity occurs in the fingerprint input apparatus in FIG. 23.

More specifically, as shown in FIG. 25, when the position of the light source 6 is a point O near the prism 1, the incident angle of light from the light source 6 with respect to a prism surface (illumination light incident surface) B-E increases with distance. As a result, the diffusion angle of light due to refraction increases, and the illuminance decreases toward a point B side on a prism surface (fingerprint collection surface) A-B.

The collation precision of a fingerprint collation system greatly depends on whether a fingerprint image can be properly input. To properly input a fingerprint image, uniform illuminance must be ensured throughout the fingerprint collection surface 1-1 of the prism 1, and illuminance irregularity must be prevented. If illuminance irregularity occurs on the fingerprint collection surface 1-1, the quality of an obtained fingerprint image deteriorates, and the collation precision deteriorates.

In Embodiment 3, therefore, the light source 6 and the prism 1 are placed close to each other to attain a reduction in size without causing any illuminance irregularity on the fingerprint collection surface 1-1. That is, both a reduction in the size of the apparatus and an improvement in the quality of a fingerprint image are attained at once.

Embodiment 3-1

Ninth, 10th, and 11th Aspects

Figure 26:
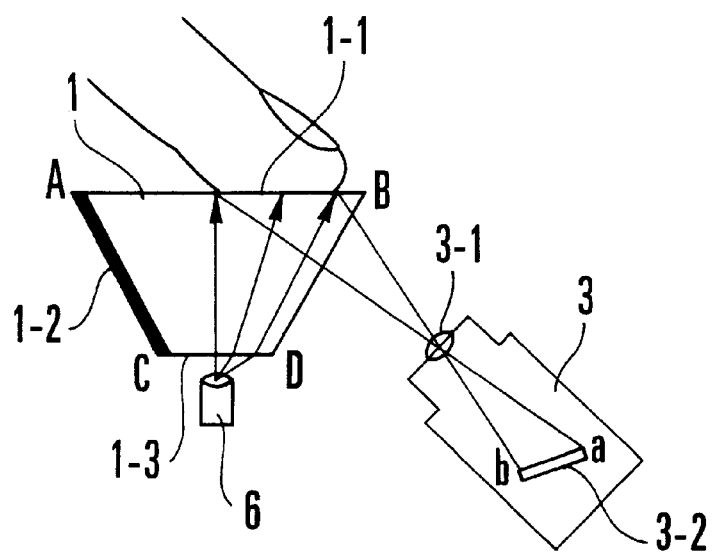
FIG. 26 is a view showing the main part (Embodiment 3-1) of a fingerprint input section according to the present invention.

FIG. 26 shows the main part of a fingerprint input apparatus according to the present invention (Embodiment 3-1). The same reference numerals in FIG. 26 denote the same parts as in FIG. 23, and a description thereof will be omitted.

In this embodiment, a cut surface 1-3 is formed at a distance from the vertex (a point E in FIG. 23) of a prism 1 which opposes a fingerprint collection surface 1-1. A light source 6 is placed to oppose the cut surface 1-3 of the prism 1. With this arrangement, light from the light source 6 enters the prism 1 through the cut surface 1-3 to be irradiated on the fingerprint collection surface 1-1 with an almost uniform diffusion angle. As a result, an almost uniform illuminance can be obtained on the fingerprint collection surface 1-1.

In this embodiment, the cut surface 1-3 is formed under conditions ①, ②, and ③ below:

① The imaging optical path from the fingerprint collection surface 1-1 to an imaging plane 3-2 should not be obstructed;

② An image of the light source 6 should not be projected on the imaging plane 3-2; and ③ Light from the light source 6 should not be totally reflected by the fingerprint collection surface 1-1.

[Condition ①]

Figure 27:
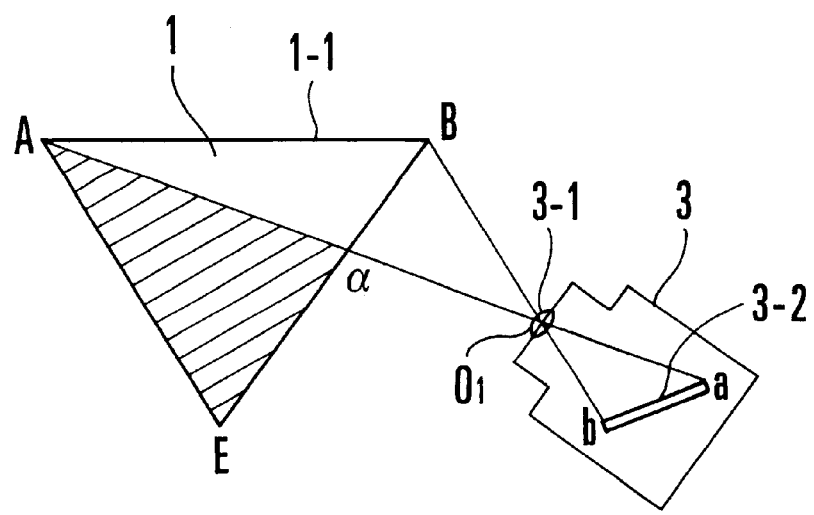
FIG. 27 is a view for explaining condition ① for the formation of a cut surface.

FIG. 27 shows a region satisfying condition ①, which is indicated by hatching. Referring to FIG. 27, if the region of the fingerprint collection surface 1-1 (A-B) is projected on the imaging plane 3-2 (a-b), light emerging from a point A is incident on the imaging plane 3-2 through the optical path "A→α→$O_1$→a". Light emerging from a point B is incident on the imaging plane 3-2 through the optical path "B→$O_1$→b". The hatched region located under a plane A-α in FIG. 27 is a region, in the prism 1, which does not obstruct the imaging optical path from the fingerprint collection surface 1-1 to the imaging plane 3-2. If the imaging optical path from the fingerprint collection surface 1-1 to the imaging plane 3-2 is obstructed, a fingerprint image on the imaging plane 3-2 deteriorates, resulting in a deterioration in collation precision.

[Condition ②]

According to Fresnel's formulas, light is reflected by the interface between media having different refractive indexes. Letting n1 and n2 be the refractive indexes of the media, a reflectance R in the case of vertical incidence is given by $R=[(n1-n2)/(n1+n2)]^2$. If the refractive index n1 is the refractive index of air (n1=1.0), and the refractive index n2 is the refractive index of glass used for the prism (n2=1.5), 4% of light is reflected according to the above equation. As is obvious from this, when light from the light source 6 is incident on the prism 1, the light is reflected by the fingerprint collection surface 1-1 owing to the position of the light source 6, and an image of the light source 6 is projected on the imaging plane 3-2. As a result, a fingerprint image on the imaging plane 3-2 deteriorates, leading to a deterioration in collation precision.

In the case shown in FIG. 28, for example, the condition in which an image of the light source 6 is not projected on the imaging plane 3-2 is that the light source 6 is located in the hatched region under a straight line extending from a point B to a point O. Letting β be the angle defined by points A, B, and E of the prism 1, ψ be the incident angle of light from a point O to a point B with respect to a surface A-B, and θ be the angle at which light reflected at the point B is refracted on a surface B-E of the prism and emerges to an end point b of the imaging plane 3-2, a reflected image of the light source 6 is not projected on the imaging plane 3-2 as long as the light source 6 is located at a position within the range of $\psi \leq \beta - \sin^{-1}(\sin\theta/n2)$ (the hatched region in FIG. 28).

[Condition ③]

In the case shown in FIG. 29, when light is incident from the n2 side of n1<n2 at the incident angle ψ, all the incident light is reflected when incident angle satisfies $\sin\psi \geq n2/n1$. This phenomenon is called total reflection. Even if the light source 6 is at a position where total reflection occurs, no influence is theoretically exerted on a fingerprint image on the imaging plane 3-2 as long as condition ② is satisfied. However, since light from light source 6 is totally reflected, stray light may become a flare or the like and affect a fingerprint image. When the light source 6 is to be placed to oppose the cut surface 1-3, the condition for the cut surface 1-3 is that light from the light source 6 is not totally reflected by the fingerprint collection surface 1-1 regardless of the position of the light source 6. Note that condition ③ is not an absolutely necessary condition, and the cut surface 1-3 may be formed under conditions ① and ② alone.

Embodiment 3-2

12th Aspect

Figure 30:
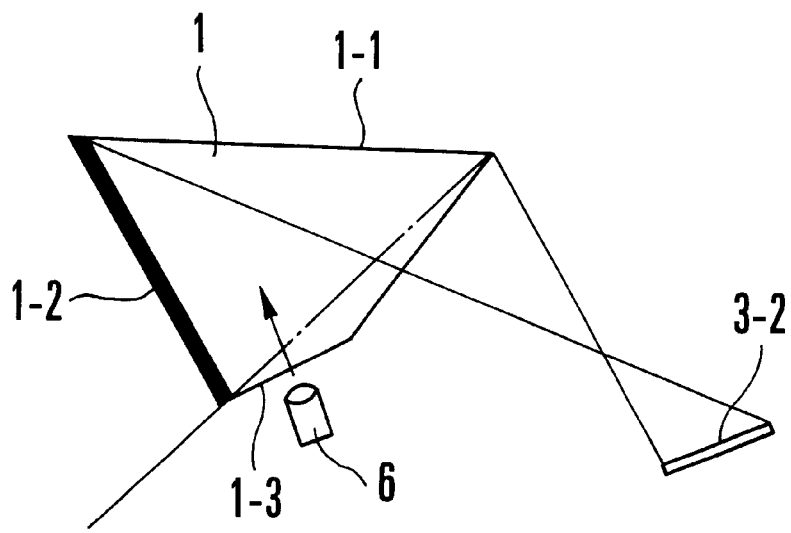
FIG. 30 is a view for explaining a problem posed when an inclined surface is formed as a cut surface while at least conditions ① and ② are satisfied.

In Embodiment 3-1, when at least conditions ① and ② are to be satisfied, the cut surface 1-3 decreases in size, and the light source 6 may not be positioned. In this case, as shown in FIG. 30, an inclined surface may be formed as a cut surface 1-3 to increase its size, as shown in FIG. 30. In this case, however, the cut surface 1-3 is excessively inclined with respect to a fingerprint collection surface 1-1. As a result, the fingerprint collection surface 1-1 cannot be uniformly illuminated. That is, the left end of the fingerprint collection surface 1-1 is mainly illuminated by a light source 6, and hence the fingerprint collection surface 1-1 cannot be uniformly illuminated.

Figure 31:
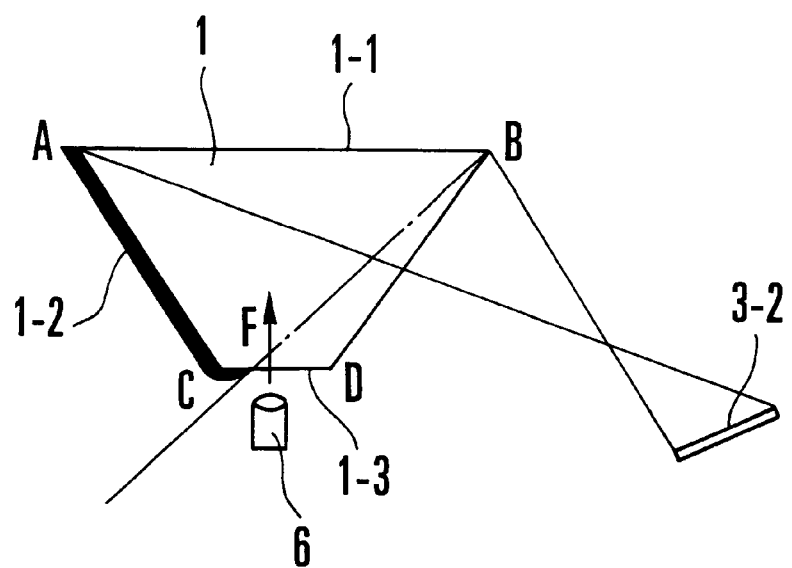
FIG. 31 is a view showing the main part (Embodiment 3-2) of a fingerprint input apparatus according to the present invention.

In contrast to this, if the distance from the vertex of the prism which opposes the fingerprint collection surface 1-1 and at which the cut surface 1-3 is formed is increased, as shown in FIG. 31, condition ① is satisfied, but ② is not satisfied (reflection condition based on Fresnel's formulas). That is, a region C-F on the cut surface 1-3 becomes a region which does not satisfy condition ②. In this embodiment, therefore, a black coating (or light-shielding plate) 1-2 is formed on the area C-F which does not satisfy condition ②.

Figure 32A:
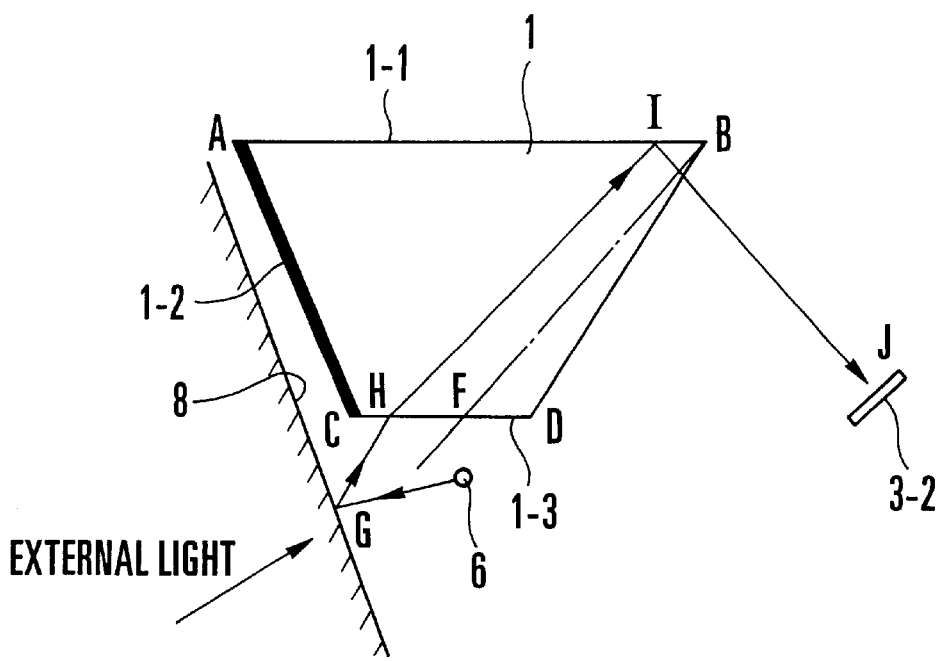
FIGS. 32A and 32B are views for explaining the necessity of light shielding for a region where condition ② is not satisfied in Embodiment 3-2.
Figure 32B:
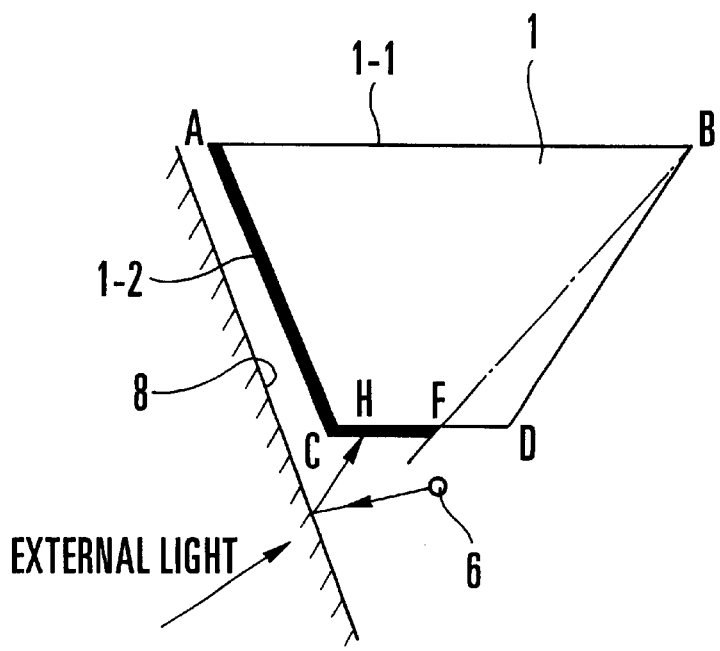

In the case shown in FIG. 31, if the light source 6 is placed at a region, on the cut surface 1-3, which satisfies condition ②, any light shield may not be required for the region which does not satisfy condition ②. As shown in FIG. 32A, however, if a wall 8 is provided to prevent disturbance light from entering the optical system, stray light propagating from the light source 6 to the wall 8 may be incident on an imaging plane 3-2 through the optical path "G→H→I→J". In contrast to this, if light shielding is provided for the region C-F which does not satisfy condition ②, as shown in FIG. 32B, the region C-F is shielded against stray light emitted from the light source 6 and reflected by the wall 8, and no stray light is incident on the imaging plane 3-2.

Embodiment 3-3

13th Aspect

In Embodiment 3-1, the cut surface 1-3 of the prism 1 is flat. In this case, light from the light source 6 is refracted by the cut surface 1-3, and the directivity increases. Strictly speaking, therefore, the peripheral portion of the fingerprint collection surface 1-1 becomes darker than the central portion.

In Embodiment 3-3, therefore, a cut surface 1-3 is formed into a concave surface, as shown in FIG. 33A. The curvature of this concave surface is matched with the directivity of a light source 6 so as to uniformly illuminate the fingerprint collection surface 1-1.

Embodiment 3-4

14th Aspect

In Embodiment 3-3, the cut surface 1-3 of the prism 1 is formed into a concave surface. In practice, however, even if the fingerprint collection surface 1-1 is illuminated with uniform intensity, a fingerprint image with uniform light intensity cannot be obtained on the imaging plane 3-2 because of vignetting on the lens 3-1 and the like or a light amount sensitivity difference caused when the imaging plane (CCD) 3-2 is inclined with respect to the optical axis.

In Embodiment 3-4, therefore, the outer periphery of a concave cut surface 1-3 is formed into a convex surface, as shown in FIG. 33B. With this structure, light from a light source 6 is diffused by a concave surface 1-3a of the central portion of the cut surface 1-3, focused by a convex surface 1-3b of the outer periphery of the cut surface 1-3, and irradiated on a fingerprint collection surface 1-1, thereby compensating the light intensity distribution on an imaging plane 3-2.

Embodiment 3-5

15th Aspect

In each of Embodiments 3-1 to 3-4, the cut surface 1-3 is formed on the prism 1 to improve illumination irregularity on the fingerprint collection surface 1-1. In contrast to this, in Embodiment 3-5, as shown in FIG. 34A, a light source 6 is placed close to a prism surface B-E through a matching member 9 having a high refractive index. No cut surface 103 is formed on a prism 1. With this structure, a light beam is not refracted by the prism surface B-E, and light from the light source 6 can be irradiated on a fingerprint collection surface 1-1 with the diffusion angle being kept almost uniform.

As a material for the matching member 9, a refractive index matching solution is known. However, a material other than this solution, e.g., an epoxy-based adhesive, may be used as long as the difference between the refractive indexes of the prism 1 and the material does not greatly influence the uniformity of illumination on the fingerprint collection surface 1-1.

In addition, as shown in FIG. 34B, a cut surface 1-3 may be formed on the prism 1, and the light source 6 may be placed close to the cut surface 1-3 through the matching member 9.

In Embodiment 3-5, a high-quality fingerprint image can be obtained with a compact apparatus, and the following additional effect can also be obtained. Since heat generated by the light source 6 is radiated onto the prism 1 through the matching member 9, perspiration of the finger is stimulated. As a result, a clear fingerprint image can be obtained.

Embodiment 4

16th to 18th Aspects

Prior to a description of the 16th to 18th aspects of the present invention, the techniques on which these aspects are based will be described. A fingerprint input apparatus includes an optical system as a constituent, and a reduction in the size of the apparatus is required in consideration of the installation place, operability, and the like. To realize such a compact fingerprint input apparatus, a surface-mounting type LED is often used as a light source.

Figure 35:
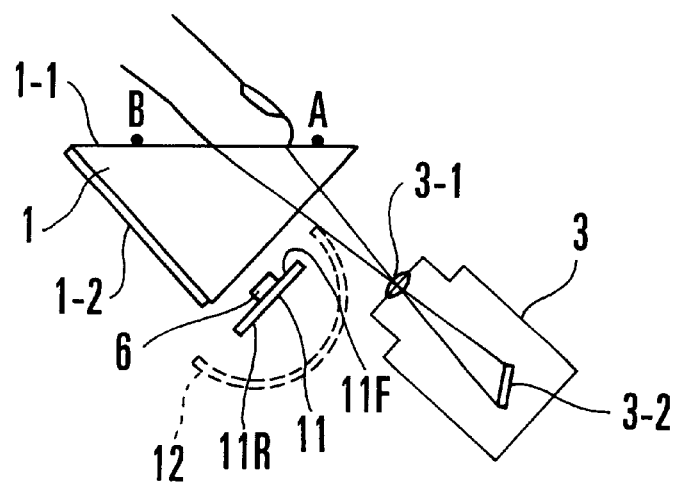
FIG. 35 is a view showing the main part of a conventional fingerprint input apparatus on which Embodiment 4 is based.

FIG. 35 shows the main part of a conventional fingerprint input apparatus. Referring to FIG. 35, reference numeral 6 denotes a light source (LED); 11, a substrate having a front surface 11F on which the LED 6 is mounted; 1, a prism; and 3, a light-receiving unit. This apparatus uses the optical path separation method. The substrate 11 having the LED 6 mounted thereon is placed on the right side of the lower surface side of the prism 1, and a black coating (or light-shielding plate) 1-2 is formed on the left-side surface of the prism 1. With this arrangement, light from the LED 6 is irradiated on the a fingerprint collection surface A-B through the prism 1. In this arrangement, light reflected by the pattern surface of a finger placed on the fingerprint collection surface A-B and emerging from the prism 1 is formed into an image on an imaging plane (CCD) 3-2 through a lens 3-1 of the light-receiving unit 3.

In this fingerprint input apparatus, however, a large amount of light leaks on the side and rear surfaces of the LED 6. That is, since light from the side and rear surfaces of the LED 6 is not incident on the prism 1, the illumination efficiency for the fingerprint collection surface A-B is poor. The collation precision of a fingerprint collation system greatly depends on whether a fingerprint image can be properly input. If, therefore, the illumination efficiency for the fingerprint collection surface A-B deteriorates, the quality of a fingerprint image deteriorates, resulting in a deterioration in collation precision.

In addition, light which is transmitted through the side surfaces of the LED 6 and the substrate 11 and leaks out from a rear surface 11R becomes stray light, which then enters, as noise, a fingerprint image formed on the CCD 3-2. As a result, the quality of the fingerprint image deteriorates, and the collation precision deteriorates.

Note that a reflecting mirror 12 like the one indicated by the dotted lines in FIG. 35 may be placed on the rear surface side of the substrate 11 to cause light transmitted through the side surfaces of the LED 6 and the substrate 11 and leaking out from the rear surface 11R to be incident on the prism 1. In this method, however, the number of parts increases, leading to an increase in cost and interfering with a reduction in size. In this case, since light transmitted through the substrate 11 and leaking out from the rear surface 11R is transmitted through the substrate 11 and incident on the prism 1, i.e., the light passes through the substrate 11 twice, the light intensity decreases.

In Embodiment 4, therefore, a high-quality fingerprint image is obtained at a low cost without interfering with a reduction in size.

Figure 36:
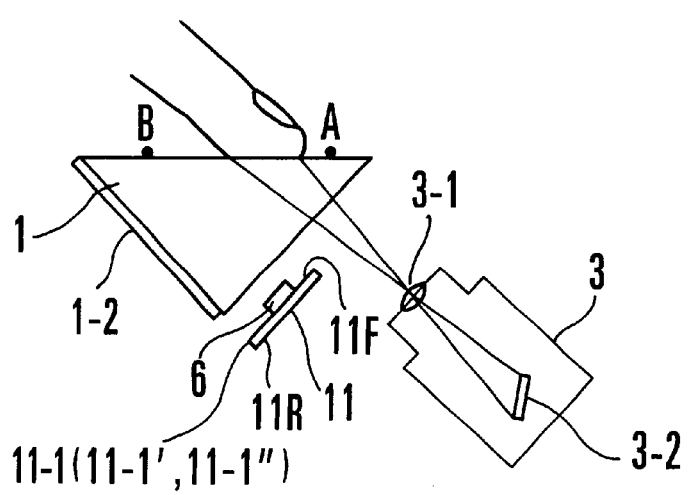
FIG. 36 is a view showing the main part (Embodiment 4) of a fingerprint input apparatus according to the present invention.

FIG. 36 shows the main part of a fingerprint input apparatus according to the present invention. The same reference numerals in FIG. 36 denote the same parts as in FIG. 35, and a description thereof will be omitted.

Embodiment 4-1

16th Aspect

In Embodiment 4-1, a film (reflecting film) 11-1 having a high reflectance is formed on a front surface 11F of a substrate 11, i.e., the front surface 11F of the substrate 11 on which an LED 6 is mounted.

Figure 37A:
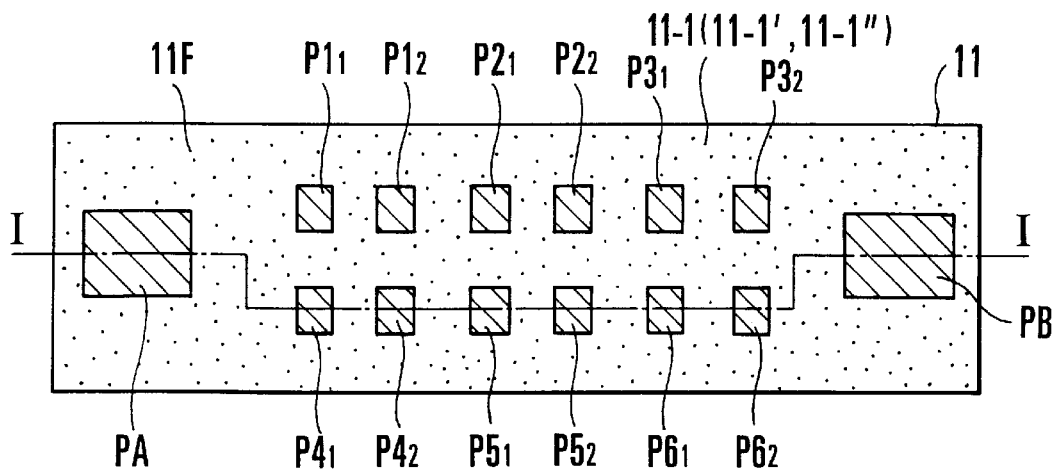
FIGS. 37A and 37B are views how a reflecting film (light-shielding film or reflecting/light-shielding film) is formed on the substrate surface of this fingerprint input apparatus.
Figure 37B:
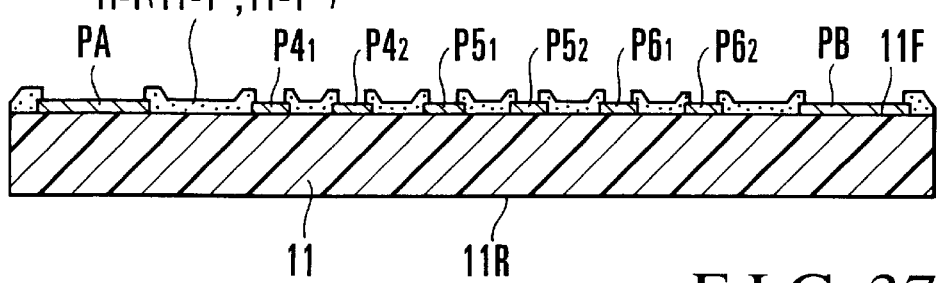

FIGS. 37A and 37B show how the reflecting film 11-1 is formed on the substrate 11. Power supply electrode pads PA and PB and LED electrode pads $P1_1$, $P1_2$, $P2_1$, $P2_2$, $P3_1$, $P3_2$, $P4_1$, $P4_2$, $P5_1$, $P5_2$, $P6_1$, and $P6_2$ are formed on the front surface 11F of the substrate 11 by etching a metal film. The reflecting film 11-1 is formed on the entire region of the substrate except for the portions where these electrode pads are formed.

A coating method, a printing method, or the like may be used to form the reflecting surface 11-1. In this embodiment, the reflecting film 11-1 is formed on the front surface 1F of the substrate 11 by a screen printing method using a white coating material. Since the reflectance of the white coating material for screen printing is 80%, light can be efficiently reflected. In addition, since the white coating material diffuses/reflects light, a uniform light intensity distribution with little directivity can be realized. Furthermore, element numbers and the like are printed on the substrate 11 by screen printing, and the reflecting film 11-1 can be formed in the same process as this printing process, this method is advantageous in terms of cost.

Figure 38A:
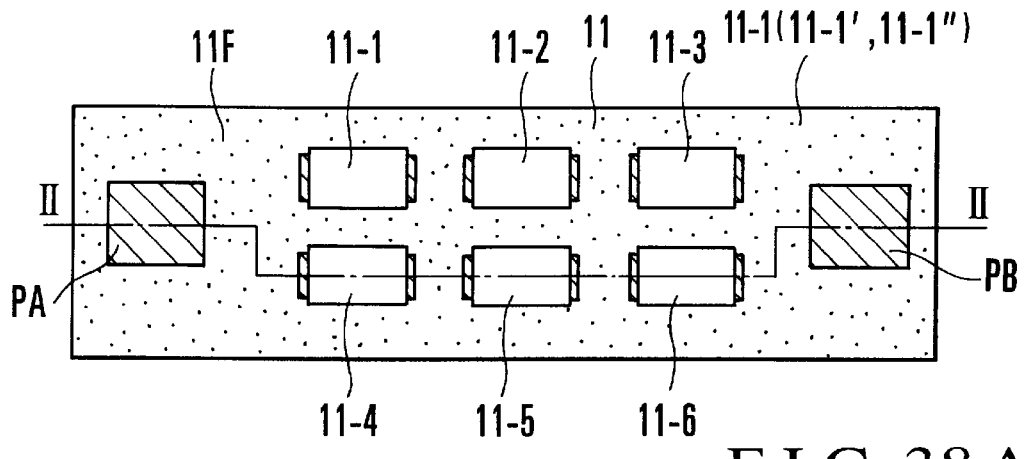
FIGS. 38A and 38B are views showing how LEDs are mounted on the substrate surface on which the reflecting film (light-shielding film or reflecting/light-shielding film) is formed.
Figure 38B:
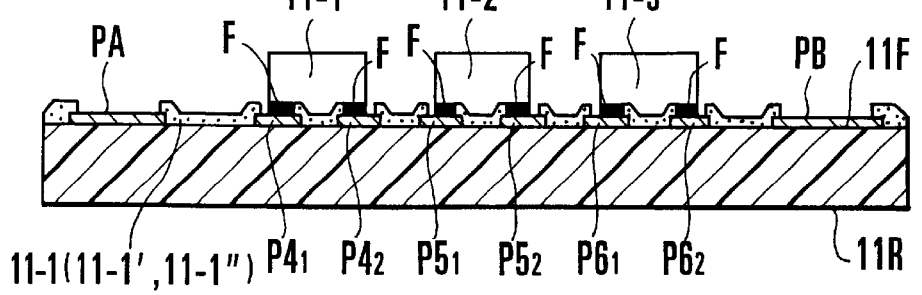

As shown in FIGS. 38A and 38B, after the reflecting film 11-1 is formed on the substrate 11, an LED 6-1 is connected to the LED pads $P1_1$ and $P1_2$ through solder portions F, an LED 6-2 is connected to the LEDs $P2_1$ and $P2_2$ through solder portions F, an LED 6-3 is connected to the LED pads $P3_1$ and $P3_2$ through solder portions F, an LED 6-4 is connected to the LED pads $P4_1$ and $P4_2$ through solder portions F, an LED 6-5 is connected to the LED pads $P5_1$ and $P5_2$ through solder portions F, and an LED 6-6 is connected to the LED pads $P6_1$ and $P6_2$ through solder portions F.

With this structure, light leaking from the side and rear surfaces of the LEDs 6-1 to 6-6 is reflected by the reflecting film 11-1 of the front surface 11F of the substrate 11 and incident on a prism 3. As a result, the illumination efficiency for the fingerprint collection surface A-B improves, and the collation precision at a low cost without interfering with a reduction in size.

Embodiment 4-2

17th Aspect

In Embodiment 4-2, a film (light-shielding film) 11-1' for shielding light is formed on a front surface 11F of a substrate 11 on which an LED 6 is mounted.

In this embodiment, as in Embodiment 1, the light-shielding film 11-1' is formed by screen printing. Note, however, that a black coating material for screen printing is used for the light-shielding film 11-1'. Since the light-shielding film 11-1' is black, light is absorbed into the coating material, thus preventing the light from passing through a rear surface 11R of the substrate 11.

With this structure, light leaking from the side and rear surfaces of LEDs 6-1 to 6-6 is shielded by the light-shielding film 11-1' of the front surface 11F of the substrate 11 to prevent the light from pass through the substrate 11 and leaking from the rear surface 11R. As a result, the amount of stray light entering, as noise, a fingerprint image formed on a CCD 3-2 decreases, and the quality of the fingerprint image improves. The collation precision can therefore be improved at a low cost without interfering with a reduction in size.

Similar to the reflecting film 11-1, the light-shielding film 11-1' is formed on the entire region of the substrate except for the portions where electrode pads P are formed. If, however, the print portion overlaps the pad portions to such an extent that no influence is exerted on bonding of the LEDs 6-1 to 6-6, leakage of light can be prevented more effectively. That is, the light-shielding characteristics improve.

Embodiment 4-3

18th Aspect

In Embodiment 4-3, a film (reflecting/light-shielding film) 11-1" having a high reflectance and serving to shield light is formed on a front surface 11F of a substrate 11 on which an LED 6 is mounted.

In this embodiment, as in Embodiment 1, the reflecting/light-shielding film 11-1" is formed by screen printing. Note, however, that a white coating material for screen printing is used for the reflecting/light-shielding film 11-1", and the film is formed thick. Since the white coating material is printed thick, light is diffused/reflected by the front surface 11F of the substrate 11. Although the absorbance of the white coating material is low, a larger amount of light can be absorbed with an increase in the thickness of the film. Even a white coating material can shield light depending on the film thickness.

With this structure, light leaking from the side and rear surfaces of LEDs 6-1 to 6-6 is reflected by the reflecting/light-shielding film 11-1" on the front surface 11F of the substrate 11 to be incident on a prism 1. As a result, the illumination efficiency for a fingerprint collection surface A-B improves, and the collation precision improves. In addition, light leaking from the side and rear surfaces of the LEDs 6-1 to 6-6 is shielded by the reflecting/light-shielding film 11-1" on the front surface 11F of the substrate 11 to prevent the light from passing through the substrate 11 and leaking out from a rear surface 11R of the substrate. As a result, the amount of stray light entering, as noise, a fingerprint image formed on a CCD 3-2 decreases, and the quality of the fingerprint image improves, thus improving the collation precision.

In Embodiment 4-3, as in Embodiment 4-2, if the print portion overlaps the pad portions to such an extent that no influence is exerted on bonding of the LEDs 6-1 to 6-6, leakage of light can be prevented more effectively, and the light-shielding characteristics improve.

Embodiment 4-4

18th Aspect

In Embodiment 4-3, the reflecting/light-shielding film 11-1" is formed by screen printing. In contrast to this, in Embodiment 4-4, a reflecting/light-shielding film 11-1" is formed by using a metal film.

Figure 39A:
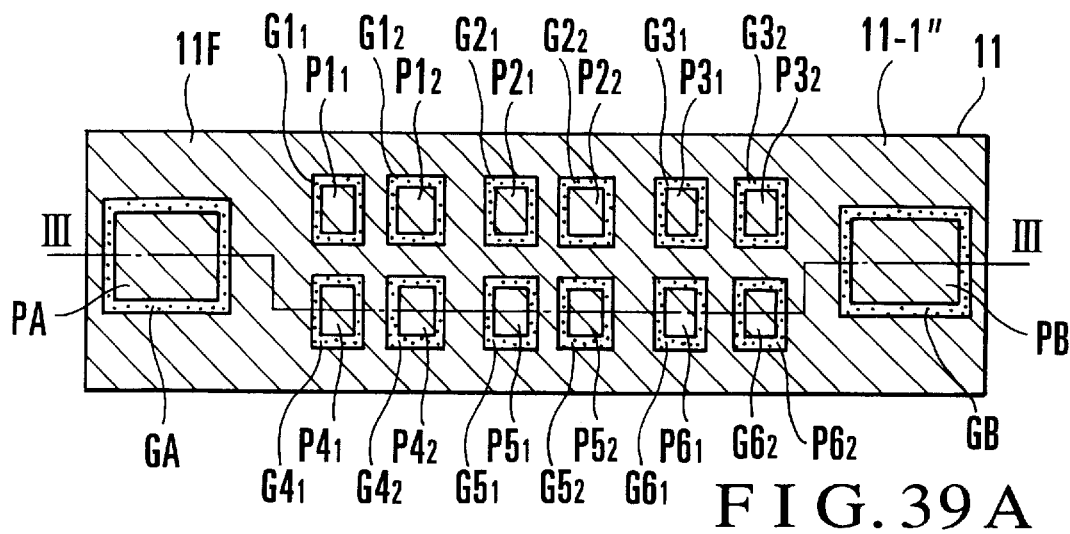
FIGS. 39A and 39B are views showing how a metal film as a reflecting/light-shielding film is formed on the substrate surface.
Figure 39B:
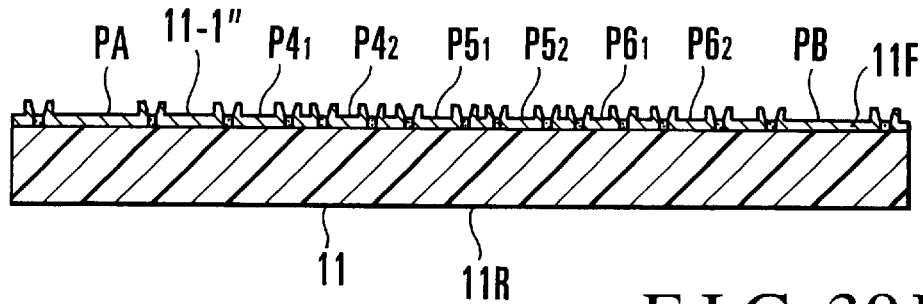

In this case, when electrode pads PA, PB, P1$_1$, P1$_2$ to P6$_1$, and P6$_2$ are to be formed on a front surface 11F of a substrate 11 by etching, gaps are ensured around the respective electrode pads P, and a metal film is left outside the gaps (see FIG. 39A). This left metal film is the reflecting/light-shielding film 11-1".

The surface of the metal film reflect light efficiently. In addition, since light is not transmitted through the film, a light-shielding effect can be ensured. In Embodiment 4-4 using the metal film as the reflecting/light-shielding film 11-1", the same effects as those of Embodiment 4-3 can be obtained.

Referring to FIG. 39A, relatively thick white coatings are formed on gaps G (GA, GB, G1$_1$, G1$_2$ to G6$_1$, and G6$_2$) ensured around the respective pads P by screen printing. With these coatings, the respective pads P can be reliably insulated from each other, and the light-shielding characteristics can be improved.

Embodiment 4-5

16th to 18th Aspects

Figure 40:
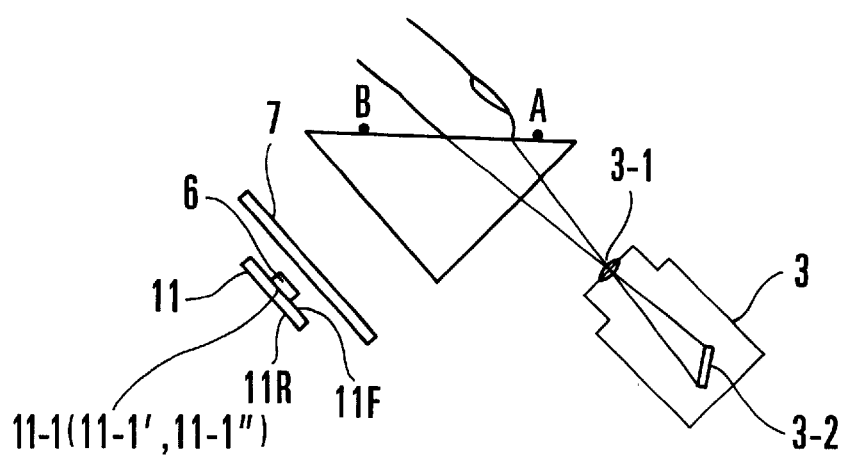
FIG. 40 is a view showing an example of how the present invention is applied to a fingerprint input apparatus using the total reflection method.

In Embodiments 4-1 to 4-4 described above, the present invention is applied to the fingerprint input apparatuses using the optical separation method. However, the present invention can also be applied to fingerprint input apparatuses using the total reflection method. As shown in FIG. 40, a fingerprint input apparatus using the total reflection method is designed such that a substrate 11 having an LED 6 mounted thereon is placed on the left side of the lower surface side of a prism 1, and light from the LED 6 is irradiated on a fingerprint collection surface A-B through a diffusion plate 7 and the prism 1. In this arrangement, a reflecting film 11-1, a light-shielding film 11-1', or a reflecting/light-shielding film 11-1" is formed on a front surface 11F of the substrate 11 having the LED 6 mounted thereon in the same manner as in the case of the fingerprint input apparatuses using the optical separation method.

Embodiment 5

19th to 24th Aspects

Prior to a description of the 19th to 24th aspects of the present invention, the techniques on which these aspects are based will be described. The collation precision of a fingerprint collation system greatly depends on whether a fingerprint image can be properly input. For example, disturbances affecting a fingerprint image input operation include dust and the like adhering to an optical system including a prism and a lens and disturbance light entering the imaging plane of a CCD. If disturbance light enters the imaging plane, a fingerprint image is made dim. A clear, high-contrast fingerprint image cannot therefore be obtained. Conventionally, a main body case for covering the overall fingerprint input apparatus is made to have a hermetic structure to protect the apparatus against such disturbances.

FIG. 41 shows the main part of a conventional fingerprint input apparatus. Referring to FIG. 41, reference numeral 6 denotes a light source; 1, a prism; 13, a prism holder; 3, a light-receiving unit; and 14, a main body case. The light source 6 is placed on the right side of the lower surface side of the prism 1. The prism 1 is held by the prism holder 13. The prism holder 13 is fixed to the main body case 14 such that a fingerprint collection surface 1-1 of the prism 1 opposes a finger mount portion opening 14-1 of the main body case 14. The light-receiving unit 3 includes a lens 3-1, an imaging plane (CCD) 3-2, and an imaging plane case 3-3. The main body case 14 has a hermetic structure.

In this fingerprint input apparatus, light from the light source 6 is irradiated on the fingerprint collection surface 1-1 through the prism 1. The light is reflected by the pattern surface of a finger placed on the fingerprint collection surface 1-1, emerges from the prism 1, and is formed into an image on the imaging plane 3-2 through the lens 3-1 of the light-receiving unit 3. In this case, the main body case 14 having a hermetic structure prevents dust and the like from adhering to the optical system including the lens 3-1 and the like, and also prevents external light (disturbance light ③) from entering the imaging plane 3-2.

In this conventional fingerprint input apparatus, however, light (disturbance light ②) emitted from the light source 6 and detouring the prism 1 to enter the imaging plane 3-2 cannot be prevented. In addition, since the main body case 14 has a hermetic structure, it is difficult to dissipate heat generated by the light source 6 and the circuits inside the case. The apparatus tends to deteriorate owing to this heat. Furthermore, since the main body case 14 is heavy, a reduction in the weight of the apparatus is interfered.

Embodiment 5 is therefore designed to reliably prevent dust and the like from adhering to an optical system and prevent disturbance light from entering the imaging plane 3-2 without making the main body case 14 have a hermetic structure, thereby obtaining a high-quality fingerprint image.

Embodiment 5-1

FIG. 42 shows the main part of a fingerprint input apparatus according to the present invention (Embodiment 5-1). The same reference numerals in FIG. 42 denote the same parts as in FIG. 41, and a description thereof will be omitted.

Figure 43:
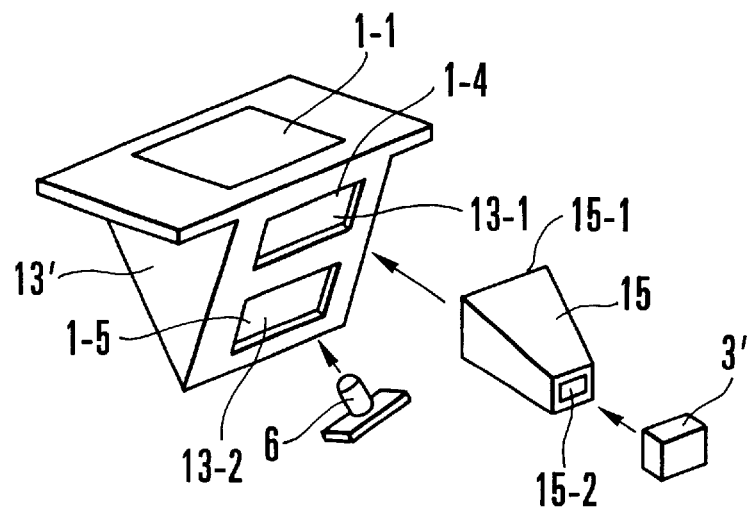
FIG. 43 is an exploded perspective view showing the main part of this fingerprint input apparatus.

In Embodiment 5-1, a light-shielding cover 15 is placed between a prism 1 and a light-receiving unit 3' to cover an imaging optical path between an exit surface 1-4 of the prism 1 and an imaging plane 3-2 while isolating the optical path from the outside. In this case, a prism holder 13' for holding the prism 1 has openings 13-1 and 13-2 formed in surface portions opposing the exit surface 1-4 of the prism 1 and an incident surface 1-5 on which light from a light source 6 is incident (see FIG. 43). An opening 15-1 of the light-shielding cover 15 on one end side is coupled to the opening 13-1 of the prism holder 13' with a fitting structure. An opening 15-2 of the light-shielding cover 15 on the other side is also coupled to an opening 3-3a of an imaging plane cover 3-3' with a fitting structure. Note that many air holes 14-2 are formed in a body case 14'.

In this fingerprint input apparatus, light from the light source 6 is irradiated on the fingerprint collection surface 1-1 through the prism 1. The light is reflected by the pattern surface of a finger placed on the fingerprint collection surface 1-1, emerges from the exit surface 1-4 of the prism 1, and is formed into an image on the imaging plane 3-2 through a lens 3-1. In this case, the light-shielding cover 15 prevents dust and the like from adhering to the optical system including the lens 3-1 and the like; external light (disturbance light ①) from entering the imaging plane 3-2 through the air holes 14-2; and light (disturbance light ②) emitted from the light source 6 from detouring the prism 1 and entering the imaging plane 3-2.

In this fingerprint input apparatus, heat generated by the light source 6 and the circuits inside the body case 14' is dissipated through the air holes 14-2 formed in the body case 14'. With the formation of the air holes 14-2 in the body case 14', the weight of the body case 14' is decreased, and hence a reduction in the overall weight of the apparatus can be attained. In addition, since the light-shielding cover 15 serves as a reinforcing member, the positional relationship between the components of the optical system can be reliably maintained against vibrations and external forces, thereby preventing offsets (size, position, and distortion) of a formed image, and allowing a fingerprint image to be stably input.

In this embodiment, an optical noise process is performed for the surface of the inner wall of the light-shielding cover 15. More specifically, a black matte coating is formed on the surface of the inner wall of the light-shielding cover 15 to prevent disturbance light ③ emerging from the prism 1 from entering the imaging plane 3-2 as optical noise. In the absence of the light-shielding cover 15, disturbance light ③ emerging from the prism 1 does not enter the imaging plane 3-2. In the presence of the light-shielding cover 15, however, the light is repeatedly reflected by the surface of the inner wall of the light-shielding cover 15 to enter the imaging plane 3-2. For this reason, the black matte coating is formed on the surface of the inner wall of the light-shielding cover 15 to prevent disturbance light ③ from entering the imaging plane 3-2. Note that an optical noise process may be performed by a method of forming a velvety coating surface by electrostatic coating, a method of forming the surface of the inner wall into an uneven surface, and the like as well as the method of forming a black matte coating. That is, entrance of light ③ into the, imaging plane 3-2 is prevented by absorbing or diffusely reflecting the light incident on the surface of the inner wall of the light-shielding cover 15.

In this embodiment, a film having a high reflectance is formed on the surface of the outer wall of the light-shielding cover 15. With this structure, light which is not directly irradiated from the light source 6 onto the prism 1 is reflected by the high-reflectance film on the surface of the outer wall of the light-shielding cover 15 to be incident on the prism 1, thereby improving the illumination efficiency.

In this embodiment, since the light-shielding cover 15 is coupled to the main body by a fitting structure, an optical system positioning effect can be obtained. In addition, since the frame and the cover are tightly coupled to each other without any gap, the light-shielding effect and the dustproof effect improve. In this case, if the light-shielding cover 15 is temporarily secured to the main body with a fitting structure, and is fastened to the main body with screws or the like afterward, the reinforcing effect improves.

Embodiment 5-2

Figure 44:
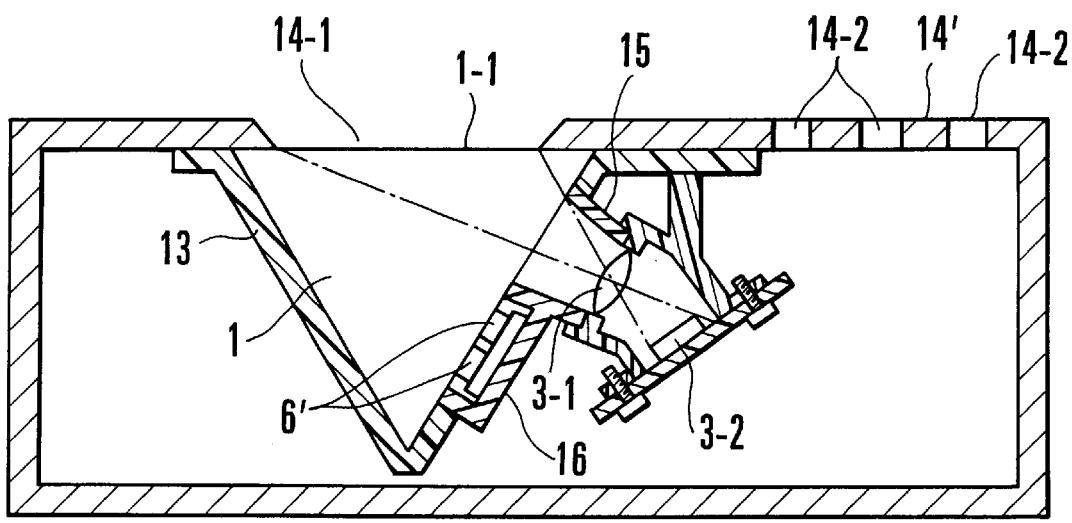
FIG. 44 is a view showing the main part (Embodiment 5-2) of a fingerprint input apparatus according to the present invention.

FIG. 44 shows the main part of a fingerprint input apparatus according to the present invention (Embodiment 5-2). In Embodiment 5-2, a light source cover 16 is provided for a light source 6'. The light source cover 16 covers the light source 6' except for a portion on the exit surface side with respect to a prism 1. In addition, the light source cover 16 and a light-shielding cover 15 are integrally formed.

In this fingerprint input apparatus, the illumination efficiency of the light source 6' with respect to the prism 1 is improved by the light source cover 16. By integrally forming the light-shielding cover 15 and the light source cover 16, the number of parts and the number of manufacturing steps can be decreased, thus attaining a reduction in cost. In addition, when the light-shielding cover 15 is positioned, the light source cover 16 is positioned at the same time, thus facilitating an assembly operation and shortening the time required for assembly. When the light-shielding cover 15 and the light source cover 16 are to be integrally formed, the molds are drawn in the same direction. For this reason, no extra mold is required.

In this embodiment, as in Embodiment 5-1, an optical noise process is performed for the surface of the inner wall of the light-shielding cover 15, a film having a high reflectance is formed on the surface of the outer wall of the light-shielding cover 15 or the light source cover 16, and the integrally formed light-shielding cover 15 and light source cover 16 are coupled to the main body with a fitting structure. In this embodiment, if a film having a high reflectance is formed on the surface of the inner wall of the light source cover 16, the reflectance increases, and the illumination efficiency improves.

In each of Embodiments 5-1 and 5-2, the lens 3-1 is used to form a fingerprint image on the imaging plane 3-2. However, a pinhole may be used in place of the lens 3-1.

In Embodiment 5-1(FIG. 42), the optical system is arranged according to the optical path separation method, but may be arranged according to the total reflection method. According to the total reflection method, the light source 6 is placed on the left side of the lower surface side of the prism 1, and light from the light source 6 is irradiated on the fingerprint collection surface 1-1 through the prism 1. In this arrangement, however, since the space for the light source 6 must be ensured on the left side of the lower surface side of the prism 1 (on the opposite side to the light-receiving unit 3'), a reduction in the size of the apparatus is limited. Embodiment 5-2 (FIG. 44) is suited for a case in which the optical system is arranged according to the optical path separation method.

As is obvious from the above description, according to the first aspect and the second, fourth, fifth, sixth, and seventh aspects associated with the first aspect, light reflected by the pattern surface of a finger placed directly or indirectly on the fingerprint collection surface and emerging from the prism passes through the pinhole to be formed into an image on the imaging plane almost parallel to the optical fingerprint collection surface of the prism. In this arrangement, since the optical path ratio is made constant, and one point on the fingerprint collection surface is imaged at one point on the imaging plane, a blur and distortion can be greatly reduced, and a high-quality fingerprint image can be obtained.

According to the third aspect and the fourth, fifth, sixth, and seventh aspects associated with the third aspect, the optical system on the first prism side and the optical system on the second prism side are set to be similar to each other. With this arrangement, light reflected by the pattern surface of a finger placed directly or indirectly on the fingerprint collection surface and emerging from the first prism passes through the pinhole to be formed into an image on the imaging plane through the second prism. A blur and distortion can be eliminated at once, and hence a high-quality fingerprint image can be obtained.

According to the eighth aspect, the imaging plane is inclined with respect to the optical axis to prevent a blur, and the central axis of the lens is inclined with respect to the optical axis to prevent trapezoidal distortion. With this arrangement, the light intensity of a fingerprint image formed on the imaging plane can be increased without increasing the intensity of light from the light source, and the occurrence of trapezoidal distortion can be greatly suppressed under the condition in which a blur is suppressed, thereby obtaining a high-quality fingerprint image.

According to the ninth aspect, light from the light source is incident on the prism through the cut surface and irradiated on the fingerprint collection surface with an almost uniform diffusion angle. The light can therefore be placed near the prism to realize a compact structure without causing illumination irregularity on the fingerprint collection surface. That is, both a reduction in the size of the apparatus and an improvement in the quality of a fingerprint image can be realized at once.

According to the 10th aspect, the imaging optical path of light propagating from the fingerprint collection surface to the imaging plane is not shielded within the prism, and an image of the light source is not projected on the imaging plane. For this reason, both a reduction in the size of the apparatus and an improvement in the quality of a fingerprint image can be realized at once.

According to the 11th aspect, the imaging optical path of light propagating from the fingerprint collection surface to the imaging plane is not shielded within the prism, and an image of the light source is not projected on the imaging plane. In addition, light from the light source is not totally reflected by the fingerprint collection surface. In addition to the effects of the 10th aspect, therefore, the effect of preventing total reflection from adversely affecting a fingerprint image can be obtained.

According to the 12th aspect, the imaging optical path of light propagating from the fingerprint collection surface to the imaging plane is not shielded within the prism, and there is no possibility that an image of the light source is projected on the imaging plane owing to the light-shielding effect provided for the cut surface. The size of the apparatus can therefore be further reduced by increasing the cut surface.

According to the 13th aspect, light from the light source is incident on the prism through the concave cut surface. With this arrangement, illumination to the fingerprint collection surface can be made uniform as compared with a case in which a flat cut surface is formed.

According to the 14th aspect, light from the light source is diffused by the concave inner surface of the cut surface and is focused by the convex surface of the outer periphery of the cut surface to be irradiated on the fingerprint collection surface. With this arrangement, the light intensity distribution on the imaging plane can be made uniform.

According to the 15th aspect, light from the light source is incident on the prism through the matching member to be irradiated on the fingerprint collection surface with an almost uniform diffusion angle. With this arrangement, both a reduction in the size of the apparatus and an improvement in the quality of a fingerprint image can be realized at once. In this arrangement of the apparatus, the prism need not have a cut surface. In addition, since heat generated by the light source is radiated to the prism through the matching member, perspiration of the finger is stimulated. As a result, an additional effect of obtaining a clear fingerprint image can be obtained.

According to the 16th aspect, light leaking from the side and rear surfaces of the light source is reflected by the reflecting film on the substrate surface and incident on the prism. As a result, the illumination efficiency for the fingerprint collection surface improves, and hence a high-quality fingerprint image can be obtained at a low cost without interfering with a reduction in size.

According to the 17th aspect, light leaking from the side and rear surfaces of the light source is shielded by the light-shielding film on the substrate surface to be prevented from passing through the substrate and leaking out from the rear surface. As a result, the amount of stray light entering, as noise, a fingerprint image formed on the imaging plane decreases, and hence the quality of a fingerprint image can be further improved at a low cost without interfering with a reduction in size.

According to the 18th aspect, light leaking from the side and rear surfaces of the light source is reflected by the reflecting/light-shielding film on the substrate surface to be incident on the prism. In addition, the light leaking from the side and rear surfaces of the light source is shielded by the reflecting/light-shielding film on the substrate surface to be prevented from passing through the substrate and leaking out from the rear surface. The effects of both the 16th and 17th aspects can therefore be obtained.

According to the 19th aspect, the light-shielding cover for covering the imaging optical path between the exit surface and imaging plane of the prism while isolating the optical path from the outside is used to reliably prevent dust and the like from adhering to the optical system; and disturbance light (disturbance light ① and ②) from entering the imaging plane, thereby obtaining a high-quality fingerprint image. In addition, since the light-shielding cover serves as a reinforming member, the positional relationship between the components of the optical system can be reliably maintained against vibrations and external forces. Offsets (size, position, and distortion) of a formed image can therefore be prevented, and a fingerprint image can be stably input.

According to the 20th aspect, since an optical noise process is performed for the surface of the inner wall of the light-shielding cover in the 19th aspect, disturbance light (disturbance light ③) emerging from the prism can be prevented from entering, as optical noise, the imaging plane.

According to the 21st aspect, since the high-reflectance film is formed on the surface of the outer wall of the light-shielding cover in the 19th or 20th aspect, light which is not directly irradiated from the light source onto the prism is reflected by the high-reflectance film to be incident on the prism. As a result, the illumination efficiency improves.

According to the 22nd aspect, since the light source cover covers the light source except for the exit surface side with respect to the prism, the illumination efficiency for the prism improves. In addition, since the light-shielding cover and the light source cover are integrally formed, the number of parts decreases. As a result, a reduction in cost can be attained.

According to the 24th aspect, the opening of the light-shielding cover on one end side is coupled to the opening of the prism holder which opposes the exit surface of the prism with the fitting structure, and the opening of the light-shielding cover on the other side is coupled to the opening of the imaging plane case with the fitting structure. When, therefore, these member are to be completely assembled with screws or the like, the three members, i.e., the prism (prism holder), the light-shielding cover, and the imaging plane cover, can be easily secured temporarily. In addition, since the coupling portions have no gaps, the light-shielding effect and the dustproof effect can be improved as well as the optical system positioning effect.

What is claimed is:

1. A fingerprint input apparatus comprising:

a first prism placed such that a surface in one direction serves as a fingerprint collection surface;

a light source for irradiating light on the fingerprint collection surface through said first prism;

a pinhole set in a path of light which is reflected by a pattern surface of a finger placed on said fingerprint collection surface and emerges from said first prism;

an imaging plane on which the light emerging from said first prism and passing through said pinhole is formed into an image; and a second prism placed in front of said imaging plane, wherein the fingerprint collection surface of said first prism is set to be substantially parallel to said imaging plane, the fingerprint collection surface of said first prism is set to be substantially parallel to a surface of said second prism on the imaging plane side, and an exit surface of said first prism with respect to said pinhole is set to be substantially parallel to an incident surface of said second prism with respect to said pinhole.

2. A fingerprint input apparatus comprising:

a prism placed such that a surface in one direction serves as a fingerprint collection surface;

a light source for irradiating light on the fingerprint collection surface through said prism;

a pinhole set in a path of light which is reflected by a pattern surface of a finger placed on said fingerprint collection surface and emerges from said prism;

a lens placed close to a rear side of said pinhole; and an imaging plane on which the light emerging from said prism and passing through said pinhole and said lens is formed into an image, wherein when a straight line connecting a center of the fingerprint collection surface and a center of said imaging plane is an optical axis, said imaging plane is inclined with respect to the optical axis to prevent a blur, and a central axis of said lens is inclined with respect to the optical axis to prevent trapezoidal distortion.

* * * * *